US012368639B2

(12) United States Patent
Mottley et al.

(10) Patent No.: US 12,368,639 B2
(45) Date of Patent: *Jul. 22, 2025

(54) CONTINUOUS SCHEDULING FOR AUTOMATED SUSPENSION AND RESUMPTION OF CLOUD RESOURCES

(71) Applicant: Capital One Services, LLC, McLean, VA (US)

(72) Inventors: Clayton Mottley, Alexandria, VA (US); Loreeg Tramblian, Glen Allen, VA (US); Cameron Mayes, Alexandria, VA (US); Amy Ann Maxwell, Henrico, VA (US); Kevin Ho, Brooklyn, NY (US); Torrance Graham, York, PA (US); Robert Wright, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,379

(22) Filed: Jun. 11, 2024

(65) Prior Publication Data
US 2024/0333588 A1   Oct. 3, 2024

Related U.S. Application Data

(63) Continuation of application No. 18/059,566, filed on Nov. 29, 2022, now Pat. No. 12,081,397.

(51) Int. Cl.
*H04L 41/0816* (2022.01)
*H04L 41/08* (2022.01)

(52) U.S. Cl.
CPC ...... *H04L 41/0816* (2013.01); *H04L 41/0886* (2013.01)

(58) Field of Classification Search
None
See application file for complete search history.

(56) References Cited

U.S. PATENT DOCUMENTS

2012/0185913 A1   7/2012   Martinez et al.

OTHER PUBLICATIONS

Cloud Custodian., "Example offhours policy," Jun. 14, 2021, 5 pages. Retrieved from the Internet:[https://cloudcustodian.io/docs/quickstart/offhours.html].
Cloud Custodian, Retrieved on Sep. 16, 2022, from https://cloudcustodian.io/; 1 page.
Co-pending U.S. Appl. No. 18/059,566, inventors Mottley; Clayton et al., filed Nov. 29, 2022.

(Continued)

*Primary Examiner* — Scott B Christensen
(74) *Attorney, Agent, or Firm* — Harrity & Harrity, LLP

(57) ABSTRACT

In some implementations, a scheduling system may receive a scheduling tag to define a custom schedule that includes one or more downtime windows for a cloud resource over a scheduling period. The scheduling system may determine a regular continuous schedule for the cloud resource that recurs over multiple scheduling periods based on the one or more downtime windows defined in the scheduling tag. The scheduling system may determine at a current scan time, whether a target state for the cloud resource is a running state or a suspended state based on the one or more uptime windows and the one or more downtime windows included in the regular continuous schedule. The scheduling system may align a current state of the cloud resource with the target state.

20 Claims, 12 Drawing Sheets

(56) References Cited

OTHER PUBLICATIONS

Instance Scheduler on AWS. Implementations, AWS Solutions, Amazon Web Services, Inc. Retrieved on Sep. 16, 2022, from https://aws.amazon.com/solutions/implementations/instance-scheduler/; 4 pages.

CONTINUOUS SCHEDULING FOR AUTOMATED SUSPENSION AND RESUMPTION OF CLOUD RESOURCES

RELATED APPLICATION

This application is a continuation of U.S. patent application Ser. No. 18/059,566, filed Nov. 29, 2022, which is incorporated herein by reference in its entirety.

BACKGROUND

Cloud computing infrastructure is the collection of hardware and software elements needed to enable cloud computing. Cloud computing infrastructures typically include computing power, networking, and storage, as well as an interface for users to access virtualized resources that mirror a physical infrastructure, with components such as servers, network switches, memory, and storage clusters, among other examples. Cloud computing infrastructures typically offer the same or similar capabilities as physical computing infrastructures but can also provide additional benefits such as a lower cost of ownership, greater flexibility, and scalability. Cloud computing infrastructures are available for private cloud, public cloud, and hybrid cloud systems. Cloud infrastructure components can also be rented from a cloud service provider, through cloud infrastructure as a service (IaaS). Cloud infrastructure systems allow for integrated hardware and software and can provide a single management platform for multiple clouds.

SUMMARY

Some implementations described herein relate to a system for automated suspension and resumption of cloud resources based on continuous scheduling. The system may include one or more memories and one or more processors communicatively coupled to the one or more memories. The one or more processors may be configured to receive a scheduling tag to define a custom schedule that includes one or more uptime windows for a cloud resource over a scheduling period, wherein the scheduling tag includes a value to express the one or more uptime windows using a syntax that is compatible with an external metadata format supported by the cloud resource. The one or more processors may be configured to determine a regular continuous schedule for the cloud resource that recurs over multiple scheduling periods based on the one or more uptime windows defined in the scheduling tag, wherein the regular continuous schedule includes the one or more uptime windows and one or more downtime windows that cover any time periods during the scheduling period that are not covered by the one or more uptime windows. The one or more processors may be configured to determine, at a current scan time, whether a target state for the cloud resource is a running state or a suspended state based on the one or more uptime windows and the one or more downtime windows included in the regular continuous schedule. The one or more processors may be configured to align a current state of the cloud resource with the target state.

Some implementations described herein relate to a method for continuous scheduling for cloud resources. The method may include receiving, by a scheduling system, a scheduling tag to define a custom schedule that includes one or more downtime windows for a cloud resource over a scheduling period. The method may include determining, by the scheduling system, a regular continuous schedule for the cloud resource that recurs over multiple scheduling periods based on the one or more downtime windows defined in the scheduling tag, wherein the regular continuous schedule includes the one or more downtime windows and one or more uptime windows that cover any time periods during the scheduling period that are not covered by the one or more downtime windows. The method may include determining, by the scheduling system, at a current scan time, whether a target state for the cloud resource is a running state or a suspended state based on the one or more uptime windows and the one or more downtime windows included in the regular continuous schedule. The method may include aligning, by the scheduling system, a current state of the cloud resource with the target state, wherein aligning the current state of the cloud resource with the target state comprises: resuming the cloud resource based on a determination, at the current scan time, that the cloud resource is in the suspended state and that the target state for the cloud resource at the current scan time is the running state; suspending the cloud resource based on a determination, at the current scan time, that the cloud resource is in the running state and that the target state for the cloud resource at the current scan time is the suspended state; or maintaining the current state of the cloud resource based on a determination, at the current scan time, that the current state of the cloud resource matches the target state for the cloud resource. . . .

Some implementations described herein relate to a non-transitory computer-readable medium that stores a set of instructions for a scheduling system. The set of instructions, when executed by one or more processors of the scheduling system, may cause the scheduling system to receive a scheduling tag to define a custom schedule for a cloud resource over a scheduling period. The set of instructions, when executed by one or more processors of the scheduling system, may cause the scheduling system to determine a regular continuous schedule for the cloud resource that recurs over multiple scheduling periods based on the scheduling tag, wherein the regular continuous schedule includes one or more uptime windows and one or more downtime windows that cover any time periods during the scheduling period that are not covered by the one or more uptime windows. The set of instructions, when executed by one or more processors of the scheduling system, may cause the scheduling system to determine, at a current scan time, whether a target state for the cloud resource is a running state or a suspended state based on the one or more uptime windows and the one or more downtime windows included in the regular continuous schedule. The set of instructions, when executed by one or more processors of the scheduling system, may cause the scheduling system to align a current state of the cloud resource with the target state.

BRIEF DESCRIPTION OF THE DRAWINGS

FIGS. 1A-1I are diagrams of an example associated with continuous scheduling for automated suspension and resumption of cloud resources, in accordance with some embodiments of the present disclosure.

FIG. 2 is a diagram of an example environment in which systems and/or methods described herein may be implemented, in accordance with some embodiments of the present disclosure.

FIG. 3 is a diagram of example components of a device associated with continuous scheduling for automated suspension and resumption of cloud resources, in accordance with some embodiments of the present disclosure.

Figure 4:
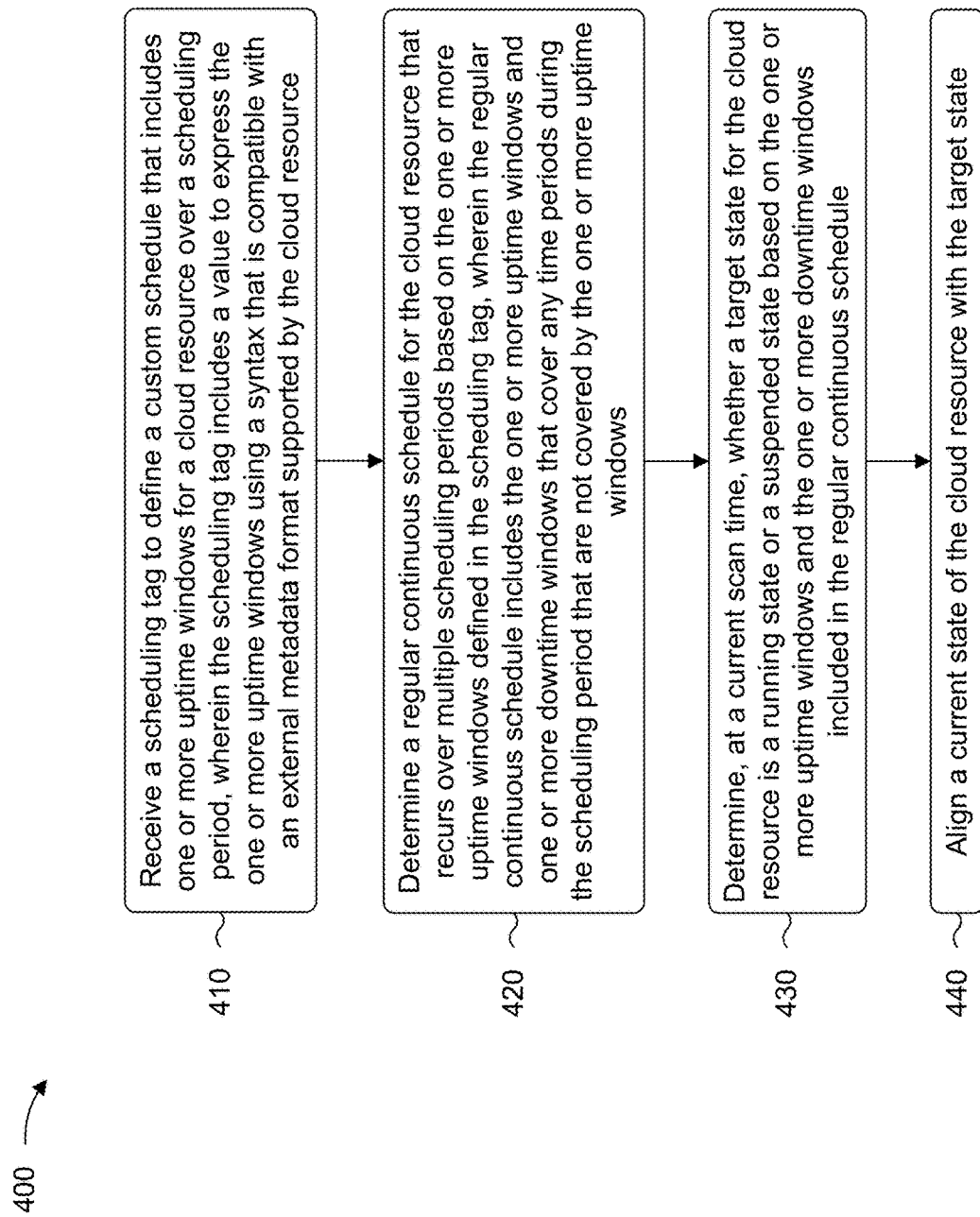

FIG. 4 is a flowchart of an example process associated with continuous scheduling for automated suspension and resumption of cloud resources, in accordance with some embodiments of the present disclosure.

DETAILED DESCRIPTION

The following detailed description of example implementations refers to the accompanying drawings. The same reference numbers in different drawings may identify the same or similar elements.

A cloud computing infrastructure may provide a set of cloud computing resources to an entity (e.g., a company, an organization, or an institution) via a cloud computing environment. The set of cloud computing resources (e.g., cloud computing resources and/or cloud storage resources) may be used by one or more users for various purposes and/or at different times. For example, cloud resources may be provisioned in the cloud computing infrastructure to allow the one or more users (e.g., employees and/or other users associated with the entity) to access and/or use the cloud resources based on a schedule.

For example, the one or more users may use the cloud resources for software development tasks and/or quality assurance tasks where the cloud resources may be used in a non-production environment (e.g., a testing environment). In a non-production environment, the one or more users may use the cloud resources only when the one or more users are working with the cloud resources (e.g., during business hours of a workweek), and, therefore, the cloud resources may be required to run only during working hours and may be suspended during off-hours (e.g., overnight when the users are working only during business hours of the workweek). Accordingly, the cloud resources may be scheduled to run during business hours of the workweek and to stop during off-hours of the workweek (e.g., to conserve computing resources).

As another example, cloud resources may be used at different times throughout a given time period, such as when the one or more users use cloud resources at different times throughout a workday and/or when an instance (e.g., an application) requires cloud resources to be available at different times throughout a workday. Accordingly, the cloud resources may be scheduled to run when being used and to stop when not being used.

In some cases, an off-hours engine may be configured to manage starting and stopping a cloud resource by performing an operation on the cloud resource at predetermined points in time. For example, an off-hours engine may use a discrete scheduling approach to scan cloud resources in a cloud computing environment at fixed time intervals (e.g., every hour) to determine whether to perform a resume operation or a suspend operation on a cloud resource based on a schedule associated with the cloud resource (e.g., defined as a tag on the cloud resource) and a current time of the scan.

For example, if a schedule associated with a cloud resource indicates that a cloud resource is to be resumed at a first time and suspended at a second time, the off-hours engine will typically resume the cloud resource only if the first time matches a time of the scan (e.g., an "on-hour" specified in the tag matches a current scan time) and may suspend the cloud resource only if the second time matches a time of the scan (e.g., an "off-hour" specified in the tag matches the current scan time).

However, because the off-hours engine only suspends or resumes a cloud resource when a scheduled stop time or a scheduled start time of the cloud resource matches a time when the scan is performed, the off-hours engine can potentially fail to suspend or resume a cloud resource if the scan is not able to be performed at the scheduled stop or start time. For example, in cases where a cloud resource has a scheduled stop time indicated as the end of a workday and the off-hours engine is unable to perform a scan at the end of the workday, the off-hours engine is unable to stop the cloud resource at the end of the workday. This causes the cloud resource to continue running at least until the next workday, which unnecessarily consumes significant computing resources, and the cloud resource is only stopped by the off-hours engine if the off-hours engine is able to perform a scan at the end of the next workday.

As another example, in cases where a new instance provisioned in the cloud computing environment uses cloud resources that were manually started after a specified off-hour (e.g., the cloud resources have a scheduled stop time that is earlier than a time of a current scan), the off-hours engine is unable to suspend the cloud resources associated with the instance until the scheduled stop time matches a current scan time (e.g., on a subsequent day), which unnecessarily consumes significant computing resources (e.g., multiple hours of unnecessary server runtime).

Further, if the off-hours engine uses a discrete scheduling approach (e.g., only performing actions on a cloud resource based on predefined conditions and/or at predefined distinct points in time), a configuration of the cloud resource must be updated (e.g., a tag on the cloud resource must be updated) to modify a schedule associated with a cloud resource. For example, in cases where a cloud resource has a scheduled stop time indicated as the end of a workday, and the scheduled stop time is modified to a time period after the end of the workday, a tag that defines the scheduled stop time must be updated to reflect the change, and the change is limited to a time of a scan.

In another example, if an issue occurs and the off-hours engine is unable to scan the cloud infrastructure for a period of time (e.g., due to an outage), the off-hours engine will fail to resume any cloud resources with scheduled resume times that occurred during the period of time when the off-hours engine was unable to scan the cloud infrastructure. In such cases, users that need to work with the cloud resources may need to manually resume the cloud resources.

Consequently, some cloud resources may remain running for extended periods of time when the cloud resources should be stopped or suspended (e.g., the cloud resources are not being utilized). This can lead to an unnecessary use or allocation of cloud resources (e.g., processing resources, memory resources, communication resources, and/or power resources, among other examples). Further, by running cloud resources that should be stopped, cloud resources that could otherwise be used to provide active cloud computing resources are not available, which may impact a performance of the active cloud computing resources or other resources of a cloud computing environment.

Additionally, or alternatively, some cloud resources may remain suspended for extended periods of time when the cloud resources should be started or resumed. This can lead to misconfigurations associated with the cloud resources. For example, if an instance uses a cloud resource that remains suspended when the cloud resource should be resumed, then the instance can experience glitches, gaps, and/or errors. This may negatively impact wait times associated with the instance and/or may lead to performance and security issues associated with the instance and/or cloud resources.

Additionally, the off-hours engine may use a tag syntax that is not compatible with creating custom schedules associated with database cloud resources (e.g., relational database service (RDS) instances). For example, an off-hours engine may use a syntax that includes special characters, such as semicolons, which cannot be used in a tag associated with database cloud resources. As such, off-hours engines that use a syntax that is invalid for database cloud resources are not able to create custom schedules associated with database cloud resources.

Some implementations described herein provide a scheduling system for automated suspension and resumption of cloud resources based on continuous scheduling. For example, the scheduling system may be used as an off-hours cloud resource management solution based on continuous scheduling (e.g., a state of a cloud resource may be considered at any point in time and/or modifications may be made based on a fully realized continuous schedule associated with a cloud resource). For example, the scheduling system may receive a schedule tag that indicates when a cloud resource is to be available. From the indicated availability of the cloud resource, the scheduling system can determine when the cloud resource does not need to be available. The scheduling system may determine a continuous schedule over a given time period based on when the cloud resource needs to be available and when the cloud resource does not need to be available. In this way, at any point in time, the scheduling system has a context to indicate whether a cloud resource should be suspended (stopped) or resumed (started) based on the continuous schedule, which allows the scheduling system to ensure that cloud resources are always aligned toward a defined target state (either suspended or resumed).

Accordingly, at periodic intervals (e.g., every fifteen minutes), the scheduling system may perform a point-in-time evaluation to determine whether a cloud resource should be available or not available, and the scheduling system may align the cloud resource with the target state based on the point-in-time evaluation determination (e.g., resuming a cloud resource if the cloud resource is suspended during a specified uptime or suspending the cloud resource if the cloud resource is running during a specified downtime). Thus, in some implementations, the scheduling system may perform operations (e.g., resume operations, suspend operations, and/or override operations) on a cloud resource based on a fully realized continuous schedule associated with the cloud resource. For example, the scheduling system may implement a temporary modification (e.g., an override) to a continuous schedule by performing a first operation (e.g., a resume or suspend operation) on a cloud resource at a first point-in-time evaluation and a second operation (e.g., a resume or suspend operation) at a second point-in-time evaluation. For example, if a cloud resource is normally scheduled to be running from 7:00 am to 7:00 μm and a user needs the cloud resource to be available from 8:00 pm until 10:00 μm, the scheduling system may perform a resume operation on the cloud resource at 8:00 μm and a suspend operation on the cloud resource at 10:00 pm to temporarily modify the schedule associated with the cloud resource (e.g., the cloud resource temporarily runs later than scheduled).

In this way, if a cloud resource is running when the cloud resource should be suspended, the scheduling system may automatically suspend the cloud resource at a next scheduled point-in-time evaluation. Similarly, if a cloud resource is suspended when the cloud resource should be running, the scheduling system may automatically resume the cloud resource at a next scheduled point-in-time evaluation. As such, for example, if an issue prevents the scheduling system from performing an operation (e.g., a resume operation or a suspend operation) specified by the continuous schedule associated with a cloud resource, the scheduling system may, once the issue is resolved, automatically perform the operation at a next scheduled point-in-time evaluation.

Additionally, for example, if a new instance provisioned in the cloud computing environment uses cloud resources that were manually started after a scheduled stop time, the scheduling system may automatically suspend the cloud resources associated with the instance at a next scheduled point-in-time evaluation.

Additionally, for example, the scheduling system may use a schedule tag that may be applied directly on the cloud resources in the cloud computing environment. For example, the schedule tag may include external metadata (e.g., external to the cloud resource) that defines a continuous schedule of the cloud resource. In some implementations, the schedule tag may use a syntax that is compatible with database cloud resources, such as RDS instances. In this way, the scheduling system may create a custom schedule associated with all cloud resource types, including database cloud resources. Furthermore, the scheduling system may enable advanced scheduling techniques, such as global overrides or resource-specific overrides to temporarily deviate from the standard schedule (e.g., during off-hours, such as holidays or non-business hours of a workday) and buffer times that may precede each time when the cloud resource needs to be available to account for delays that may occur in starting the cloud resource. For example, the scheduling system may use overrides to modify a continuous schedule associated with a cloud resource without changing a configuration of the cloud resource (e.g., the override may be stored and overlaid internally within the scheduling system, thereby temporarily modifying the continuous schedule of the cloud resource without needing to modify the scheduling tag applied to the cloud resource). In other words, in some implementations, system-level modifications may modify a schedule associated with a cloud resource rather than resource-level modifications. As another example, the scheduling system may use buffers to automatically extend an initial time of a scheduled start operation (e.g., if an initial start time is 7:00 am, the buffer may be set to 6:30 am) to ensure that a cloud resource is fully running by the initial time of the start operation. For example, the scheduling system may automatically estimate the average resumption time of cloud resources, depending on resource type, and may schedule a cloud resource to start or resume earlier than scheduled such that the cloud resource will be fully available by the start time specified in the continuous schedule. This may reduce unnecessary use or allocation of computing resources (e.g., processing resources, memory resources, communication resources, and/or power resources, among other examples) associated with running a cloud resource that should be stopped. This may further allow computing resources, that would otherwise be used to run a cloud resource, to be used elsewhere in the cloud computing environment.

FIGS. 1A-1I are diagrams of an example 100 associated with continuous scheduling for automated suspension and resumption of cloud resources. As shown in FIGS. 1A-1I, example 100 includes a cloud infrastructure, a scheduling system, and/or a user device. These devices are described in more detail in connection with FIGS. 2 and 3.

Figure 1A:
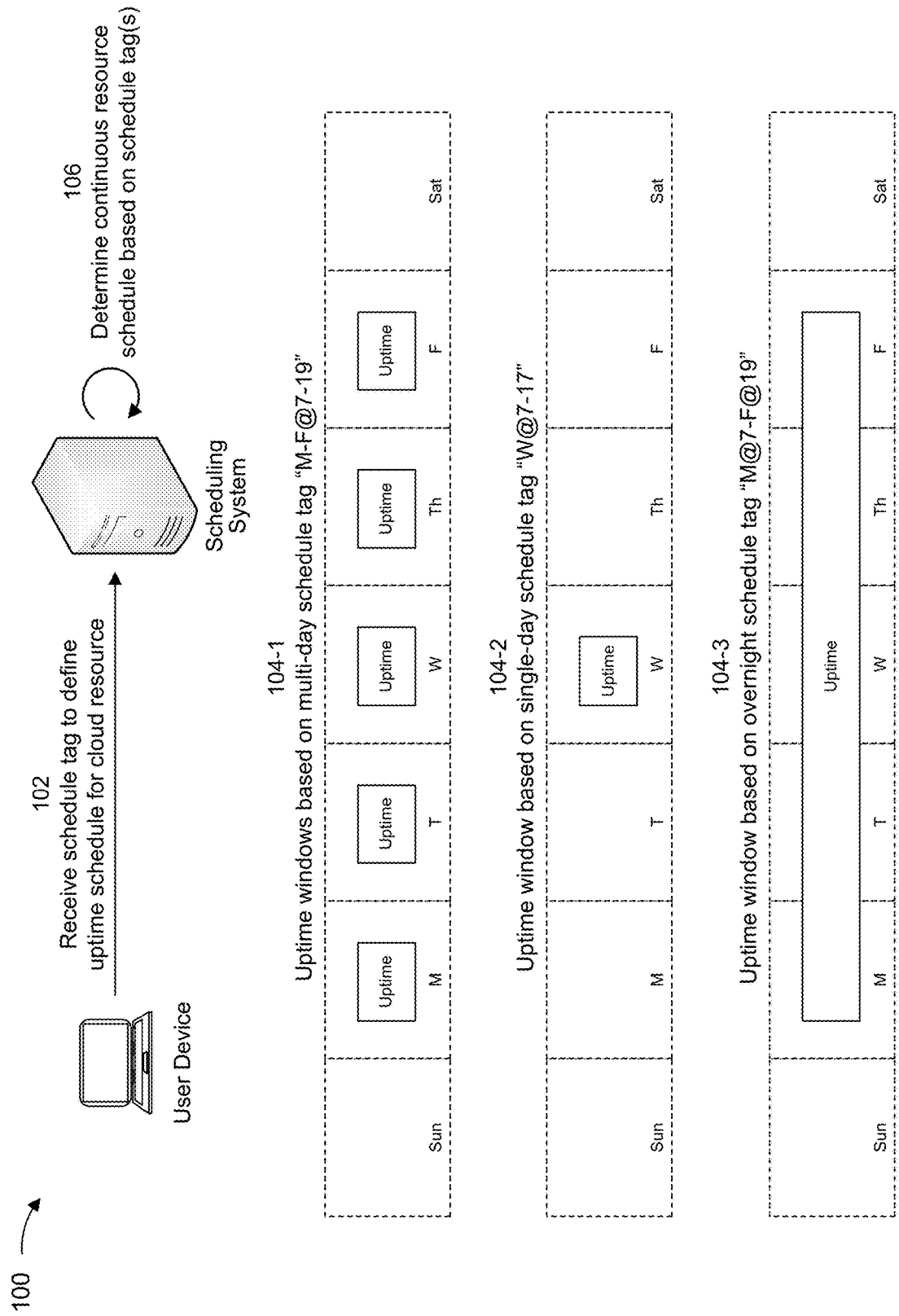

As shown in FIG. 1A, and by reference number 102, a user device may provide, and the scheduling system may receive, a scheduling tag (sometimes called a schedule tag)

to define an uptime schedule for a cloud resource (e.g., a cloud service). In some implementations, the cloud resource may be in either a first state (e.g., a running state or an active state) or a second state (e.g., a suspended or inactive state) at any given time. In some implementations, the scheduling tag may be used to define a custom schedule that includes an uptime window (e.g., one or more uptime windows) for a cloud resource over a scheduling period. An uptime window may indicate a duration or time period when a cloud resource should be in a running state. In some implementations, a scheduling tag may include a key that may indicate that the scheduling tag defines an uptime window (e.g., one or more uptime windows) and a value that may express the uptime window using a syntax that is compatible with an external metadata format supported by the cloud resource.

In some implementations, a syntax of the value may include a multi-day syntax that specifies a recurring uptime window associated with multiple days, a single-day syntax that specifies an uptime window associated with a single day, or an overnight syntax that specifies an uptime window that starts on a first day and ends on a second day. For example, the scheduling tag may include a key that indicates "uptime_schedule" and a value expressed using a multi-day syntax (e.g., <starting_day>-<ending_day>@<start_time>-<end_time>), a single-day syntax (e.g., <day>@start_time>-<end_time>), or an overnight syntax (e.g., <starting_day>@<start_time>-<ending_day>@<end_time>), as described in more detail elsewhere herein. While the key has been described above as being associated with an uptime schedule, in some implementations, the key may be associated with a downtime schedule and may use a similar format as described herein. For example, in some implementations, day values associated with the syntax may be expressed as "M" for Monday, "T" for Tuesday, "W" for Wednesday, "R" for Thursday, "F" for Friday, "S" for Saturday, and "U" for Sunday. In some implementations, time values associated with the syntax may be expressed in military time or 24-hour time based on a configured time zone (e.g., Eastern Standard Time (EST) zone). For example, acceptable time values may be 7:00, 12, 9:10, 8:15, and/or 23:30.

As shown by reference number 104-1, in some implementations, an uptime window associated with a cloud resource may be based on a multi-day syntax that specifies a starting time and an ending time associated with multiple days (e.g., shown as "M-F@7-19" in FIG. 1A). In some implementations, a value expressed using a multi-day syntax may include a start day parameter (e.g., starting_day) that indicates a first day that a cloud resource is to be in a running state, an end day parameter (e.g., ending_day) that indicates the last day that the cloud resource is to be in the running state, a start time parameter (e.g., start_time) that indicates a time that the cloud resource should start to be in the running state on each day, and an end time parameter (e.g., end_time) that indicates a time that the cloud resource should cease to be in the running state on each day.

For example, if an uptime window for a cloud resource based on a multi-day syntax indicates that the cloud resource is to be in a running state during business hours of a workweek (e.g., Monday through Friday from 7:00 am to 7:00 pm), a value that expresses uptime windows using a multi-day syntax may indicate a start day parameter of "Monday," an end day parameter of "Friday," a start time parameter of 7:00 am, and an end time parameter of 7:00 pm, which may be expressed as uptime_schedule: M-F@7-19.

As another example, if an uptime window for a cloud resource based on the multi-day syntax indicates that the cloud resource is to be in a running state every day during certain hours (e.g., Monday through Sunday from 7:00 am to 7:00 pm), a value that expresses uptime windows using the multi-day syntax may indicate a start day parameter of "Monday," an end day parameter of "Sunday," a start time parameter of 7:00 am, and an end time parameter of 7:00 pm, which may be expressed as uptime_schedule: M-U@7-19.

As shown by reference number 104-2, in some implementations, an uptime window associated with a cloud resource may be based on a single-day syntax that specifies a starting time and an ending time associated with a single day (e.g., shown as "W@7-17" in FIG. 1A). In some implementations, a value expressing an uptime window using a single-day syntax may include a day parameter that indicates a day that a cloud resource is to be in a running state, a start time parameter that indicates a first time of the day that the cloud resource is to be in the running state, and an end time parameter that indicates an end time of the day that the cloud resource is to be in a running state.

For example, if an uptime window for a cloud resource based on the single-day syntax indicates that the cloud resource is to be in a running state on Saturday from 5:00 am to 8:00 pm, a single-day schedule tag may include a start day parameter of "Saturday," a start time parameter of 5:00 am, and an end time parameter of 8:00 pm, which may be expressed as uptime_schedule: S@5-20.

As another example, if an uptime window for a cloud resource based on the single-day syntax indicates that the cloud resource is to be in a running state on Wednesday from 7:00 am to 5:00 pm, a single-day schedule tag may include a start day parameter of "Wednesday," a start time parameter of 7:00 am, and an end time parameter of 5:00 pm, which may be expressed as uptime_schedule: W@7-17.

As shown by reference number 104-3, in some implementations, an uptime window associated with a cloud resource may be based on an overnight syntax that specifies a starting time on a first day and an ending time on a second day (e.g., shown as "M@7-F@19" in FIG. 1A). In some implementations, a value expressing an uptime window using an overnight syntax may include a start day parameter that indicates a first day that a cloud resource is to start being in a running state, an end day parameter that indicates a last day that the cloud resource is to be in the running state, a start time parameter that indicates a time on the first day that the cloud resource is to start being in the running state, and an end time parameter that indicates a time on the last day when the cloud resource is to cease being in a running state.

For example, if an uptime window for a cloud resource based on the overnight syntax indicates that the cloud resource is to be in a running state during a time period that starts at 7:00 am on Monday and ends at 7:00 pm on Friday, an overnight scheduling tag may include a start day parameter of "Monday," an end day parameter of "Friday," a start time parameter of 7:00 am, and an end time parameter of 7:00 pm, which may be expressed as uptime_schedule: M@7-F@19.

As another example, if an uptime window for a cloud resource based on the overnight syntax indicates that the cloud resource is to be in a running state from 7:00 pm on Monday until 4:00 am on Tuesday, an overnight scheduling tag may include a start day parameter of "Monday," an end day parameter of "Tuesday," a start time parameter of 7:00 μm, and an end time parameter of 4:00 am, which may be expressed as uptime_schedule: M@19-T@4.

While examples of using scheduling tags to define uptime windows have been described in connection with reference numbers 104-1, 104-2, and 104-3, in some implementations, scheduling tags may be used to define downtime windows. For example, the scheduling tag may include a key that indicates "cml_downtime" and a value that defines a downtime window, which may be expressed in a similar manner as described above.

For example, if a downtime window for a cloud resource based on the multi-day syntax indicates that the cloud resource is to be in a suspended state from midnight to 7:00 am Monday through Friday, a value that expresses the downtime windows using the multi-day syntax may indicate a start day parameter of "Monday," an end day parameter of "Friday," a start time parameter of midnight, and an end time parameter of 7:00 am, which may be expressed as cml_downtime: M-F@0-7.

In another example, if a downtime window for a cloud resource based on the single-day syntax indicates that the cloud resource is to be in a suspended state during a portion of a single day (e.g., Saturday from midnight to 5:00 am), a single-day schedule tag may include a start day parameter of "Saturday," a start time parameter of midnight, and an end time parameter of 5:00 am, which may be expressed as cml_downtime: S@0-5.

In another example, if a downtime window for a cloud resource based on the overnight syntax indicates that the cloud resource is to be in a suspended state during a time period that starts on a first day and ends on a second day (e.g., from 7:00 pm Monday to 7:00 am Tuesday), an overnight scheduling tag may include a start day parameter of "Monday," an end day parameter of "Tuesday," a start time parameter of 7:00 μm, and an end time parameter of 7:00 am, which may be expressed as cml_downtime: M@19-T@7.

As shown by reference number 106, the scheduling system may determine a continuous resource schedule for a cloud resource based on a scheduling tag that is provided for the cloud resource (e.g., by the user device). In some implementations, a continuous resource schedule may be a continuous schedule (e.g., a regular or periodic continuous schedule) for a cloud resource that may recur over multiple scheduling periods based on an uptime window defined in the scheduling tag. In some implementations, the continuous schedule may include one or more uptime windows and one or more downtime windows. A downtime window may indicate a time at which a cloud resource is to be in a suspended state. As such, in some implementations, a downtime window may cover any time period during the multiple recurring scheduling periods that is not covered by an uptime window. In other words, an uptime window may cover a time period during which the cloud resource is to be in a running state in each recurring scheduling period, and a downtime window may cover a time period during which the cloud resource is to be in a suspended state in each recurring scheduling period.

For example, if a value expressing an uptime window using a multi-day syntax indicates that a cloud resource is to be in a running state during business hours of a workweek (e.g., Monday through Friday from 7:00 am to 7:00 pm), the continuous schedule for the cloud resource may include uptime windows from 7:00 am to 7:00 pm on each of Monday through Friday, downtime windows from midnight to 7:00 am and from 7:00 pm to midnight on each of Monday through Friday, and downtime windows spanning all of Sunday and Saturday.

Figure 1B:
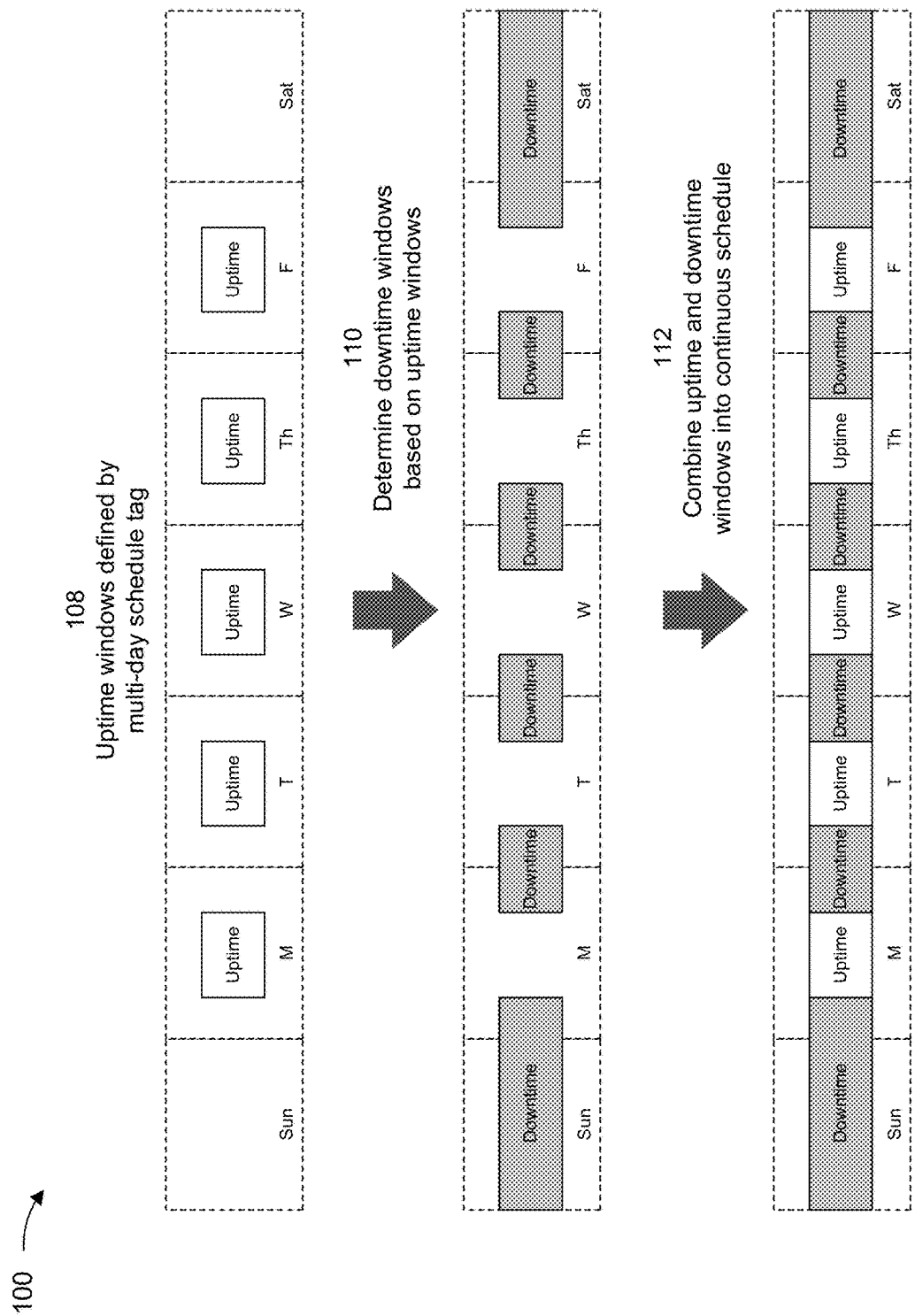

For example, referring to FIG. 1B, reference number 108 depicts an example in which the scheduling system defines one or more uptime windows for a cloud resource based on a multi-day scheduling tag. For example, if a multi-day scheduling tag includes a key (e.g., uptime_schedule) indicating that the scheduling tag defines an uptime window and a value that expresses the uptime window using the multi-day syntax indicated as M-F@7-19 (e.g., defining uptime windows for a cloud resource on Monday through Friday from 7:00 am to 7:00 pm), the scheduling system may determine uptime windows for Monday through Friday based on the multi-day scheduling tag. As shown in FIG. 1B, the uptime windows each fall within a one-week scheduling period including days of Sunday through Saturday.

As shown in FIG. 1B, and by reference number 110, the scheduling system may determine one or more downtime windows within the scheduling period based on the one or more uptime windows defined by the scheduling tag. For example, in FIG. 1B, the multi-day scheduling tag defines uptime windows for a cloud resource that occur from 7:00 am to 7:00 pm on Monday through Friday. Accordingly, in this example, the scheduling system may determine downtime windows that cover any time periods not covered by an uptime window, which include the time periods of Sunday at midnight through Monday at 7:00 am, 7:00 μm to 7:00 am on Monday through Thursday night, and Friday at 7:00 pm through the end of the day on Saturday.

As further shown in FIG. 1B, and by reference number 112, the scheduling system may combine the one or more uptime windows and the one or more downtime windows into a continuous schedule that covers a recurring or periodic scheduling period (e.g., one week in the illustrated example). For example, the uptime windows and the downtime windows may be combined to generate a continuous schedule that defines time periods that the cloud resource is to be in a running state and time periods that the cloud resource is to be in a suspended state, which collectively cover the entire scheduling period.

Figure 1C:
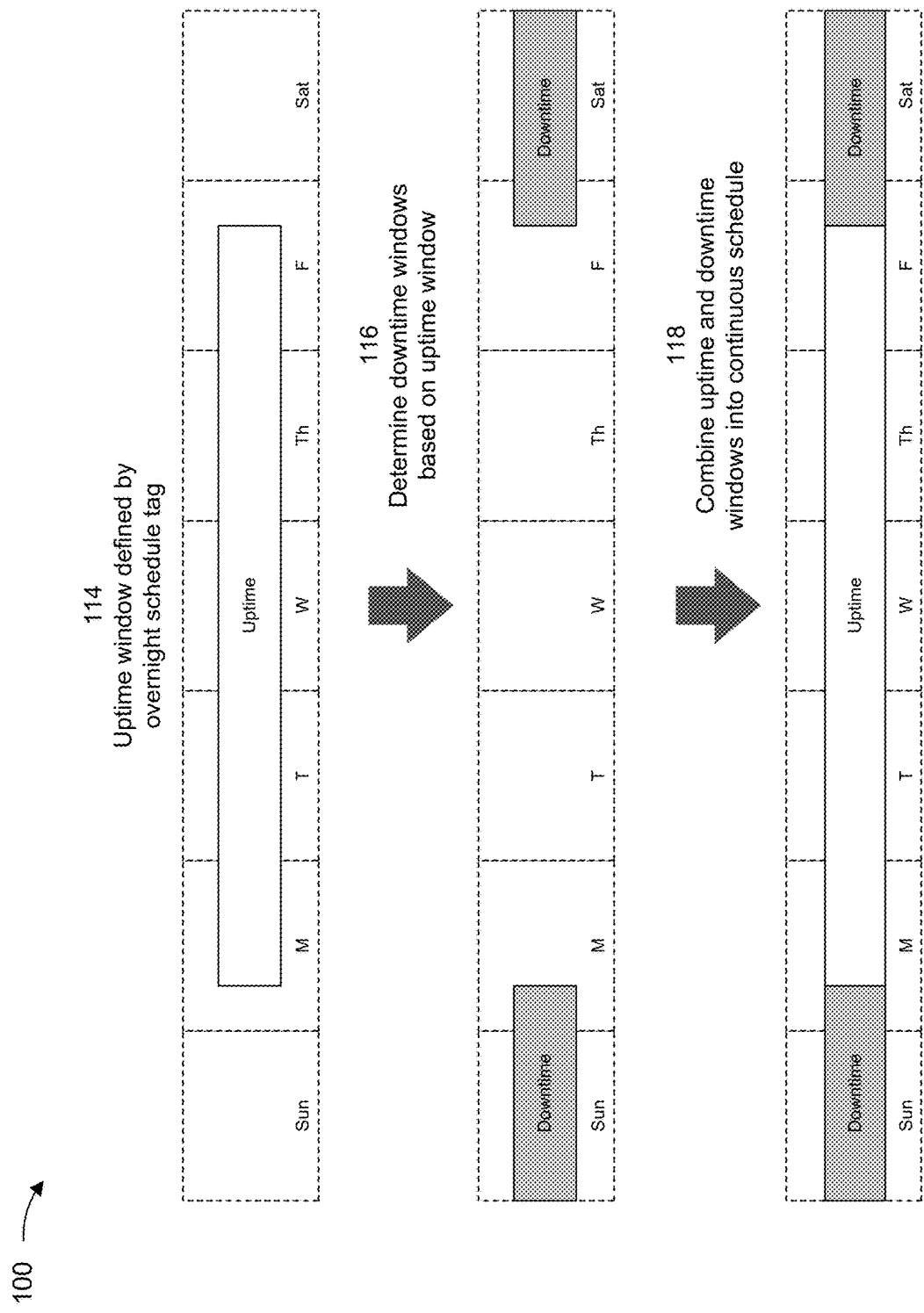

In another example, referring to FIG. 1C, reference number 114 depicts an example in which the scheduling system defines a continuous schedule for a cloud resource based on one or more uptime windows specified in an overnight scheduling tag. For example, in FIG. 1C, an overnight scheduling tag may include a key (e.g., uptime_schedule) indicating that the scheduling tag defines an uptime window and a value that expresses the uptime window using the multi-day syntax (e.g., indicated as M@7-F@ 19 to define an uptime window for a cloud resource from 7:00 am Monday to 7:00 pm Friday). As shown in FIG. 1C, the uptime window falls within a one-week scheduling period including days of Sunday through Saturday.

As shown in FIG. 1C, and by reference number 116, the scheduling system may determine one or more downtime windows within the scheduling period based on the uptime window defined by the overnight scheduling tag, in a similar manner as described above in connection with reference number 110 of FIG. 1B and elsewhere herein. For example, in FIG. 1C, the overnight scheduling tag defines an uptime window for a cloud resource that occurs from 7:00 am Monday to 7:00 pm on Friday. Accordingly, in this example, the scheduling system may determine downtime windows that cover any time periods not covered by the uptime window, which include time periods of midnight on Sunday (the start of the scheduling period) through 7:00 am on Monday and Friday at 7:00 pm through midnight on Sunday (the end of the scheduling period).

As further shown in FIG. 1C, and by reference number 118, the scheduling system may combine the uptime window defined by the overnight scheduling tag and the one or more downtime windows determined based on the uptime window into a continuous schedule that covers a recurring or periodic scheduling period (e.g., one week in the illustrated example). For example, the uptime windows and the downtime windows may be combined to generate a continuous schedule that defines one or more time periods that the cloud resource is to be in a running state and one or more time periods that the cloud resource is to be in a suspended state, which collectively cover the entire scheduling period.

In some implementations, the scheduling system may use a reverse approach relative to the approach described in connection with FIG. 1B and FIG. 1C. For example, FIGS. 1B-1C describe techniques to determine one or more downtime windows based on one or more uptime windows defined in a scheduling tag and then combine the one or more uptime windows and the one or more downtime windows into a continuous schedule covering an entire scheduling period. Alternatively, the scheduling system may receive a scheduling tag defining one or more downtime windows, define any time periods in a scheduling period that are not covered by a downtime window as an uptime window, and then similarly combine the downtime and uptime windows into a continuous schedule covering an entire scheduling period.

Figure 1D:
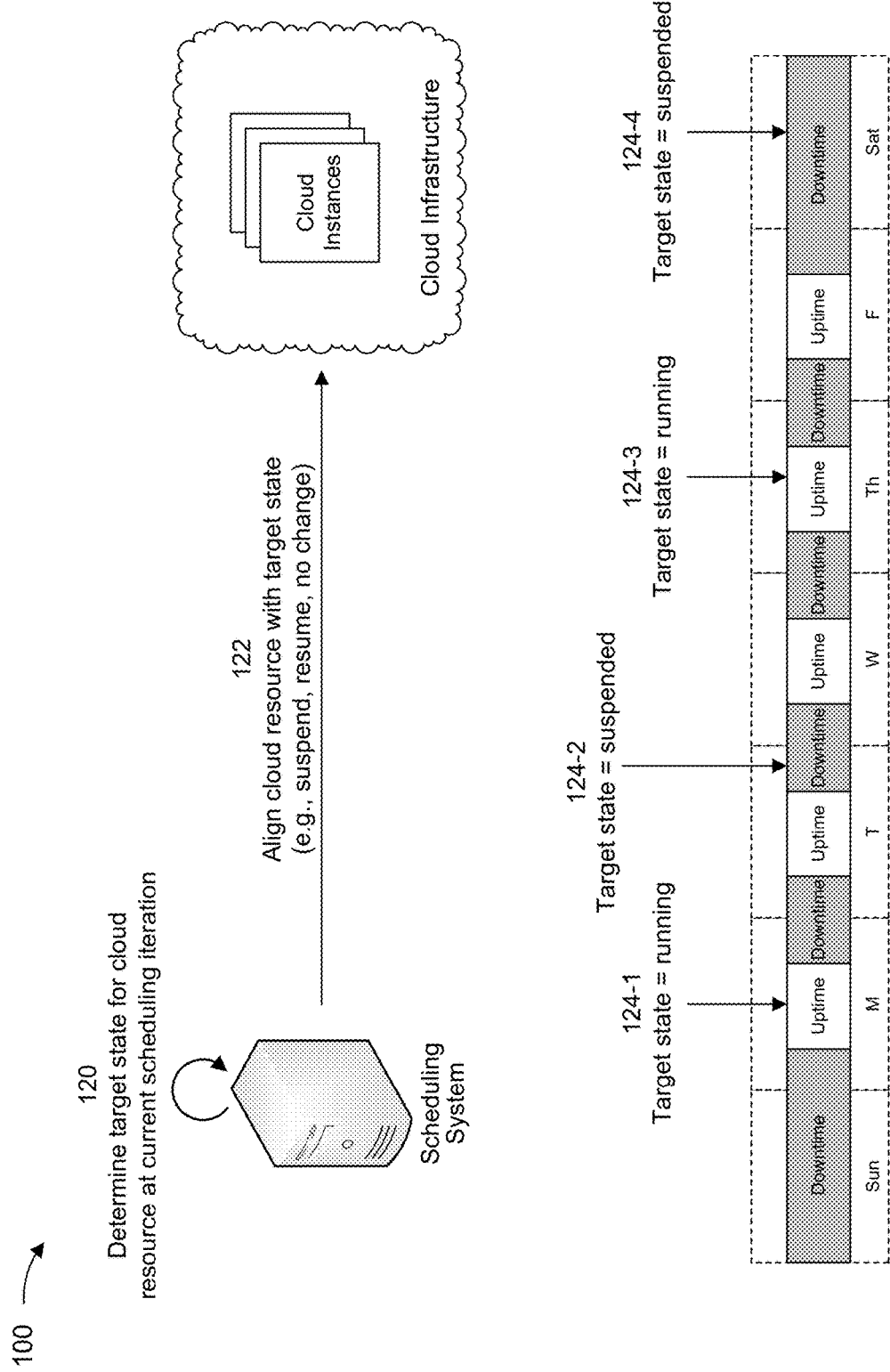

As shown in FIG. 1D, and by reference number 120, the scheduling system may determine a target state for a cloud resource at a current scheduling iteration. In some implementations, the scheduling system may determine a target state for each cloud resource based on scheduling iterations that may occur at a given periodicity (e.g., every few minutes). Thus, in some implementations, the scheduling system may perform point-in-time evaluations at discrete times based on a continuous schedule associated with each cloud resource. In some implementations, the scheduling system may scan one or more cloud resources to determine, at a current scan time, whether a target state for the cloud resource is a running state or a suspended state based on a continuous schedule that covers an entire scheduling period for the cloud resource. The scheduling system may determine a continuous schedule associated with each of the cloud resources, as described above. For example, as described above, the continuous schedule for a cloud resource does not include any gaps between the uptime and downtime windows (e.g., a downtime window immediately begins when an uptime window ends, and vice versa), whereby a target state for each cloud resource (either running or stopped) is known for every point in time. Accordingly, in some implementations, the scheduling system may determine that a target state for a cloud resource at a current scan time is a running state based on the current scan time being within an uptime window of the continuous schedule, or may determine that the target state for the cloud resource at the current scan time is a suspended state based on the current scan time being within a downtime window of the continuous schedule.

As shown in FIG. 1D, and by reference number 122, the scheduling system may align a cloud resource with the target state of the cloud resource. In some implementations, the scheduling system may align a cloud resource with a target state of the cloud resource based on a comparison between a current state of the cloud resource and the target state of the cloud resource. For example, the scheduling system may submit an application program interface (API) call to identify a current state of a cloud resource and may take appropriate action to ensure that the current state of the cloud resource is aligned with (e.g., matches) the target state that is based on the continuous schedule.

For example, if a target state of a first cloud resource is a running state and a target state of a second cloud resource is a suspended state, the scheduling system may submit an API call to determine a current state of the first cloud resource and the second cloud resource. For example, if the scheduling system determines that the current state of the first cloud resource is a running state, the scheduling system may refrain from performing an operation on the first cloud resource (e.g., the scheduling system refrains from changing a state of the first cloud resource, and therefore maintains the current state of the first cloud resource, because the current state matches the target state). On the other hand, if the current state of the first cloud resource is determined to be a suspended state, the scheduling system may resume the first cloud resource to align the current state with the target state. In another example, if the scheduling system determines that the current state of the second cloud resource is a running state, the scheduling system may perform an operation on the second cloud resource to align the current state with the target state (e.g., the scheduling system may change a current state of the second cloud resource from the running state to the suspended state). On the other hand, if the current state of the second cloud resource is the suspended state, which matches the target state of the second cloud resource, the scheduling system may refrain from performing an operation to change the state of the second cloud resource (e.g., may maintain the current state of the second cloud resource).

As shown in FIG. 1D, and by reference number 124-1, the scheduling system may determine a target state for a cloud resource, based on a time when the evaluation associated with the cloud resource is being performed. As shown by reference number 124-1, the evaluation may be performed at a first time (e.g., mid-day on Monday) that corresponds to an uptime window of a continuous schedule, whereby the target state of the cloud resource is a running state. Accordingly, at the first time, the scheduling system may either resume the cloud resource if the current state of the cloud resource is suspended, or may maintain the current state of the cloud resource if the current state of the cloud resource is running.

As shown in FIG. 1D, and by reference number 124-2, the scheduling system may determine a target state for a cloud resource, based on a time when the evaluation associated with the cloud resource is being performed. As shown by reference number 124-2, the evaluation may be performed at a second time (e.g., evening on Tuesday) that corresponds to a downtime window of a continuous schedule, whereby the target state of the cloud resource is a suspended state. Accordingly, at the second time, the scheduling system may either suspend the cloud resource if the current state of the cloud resource is running, or may maintain the state of the cloud resource if the current state of the cloud resource is suspended.

As shown in FIG. 1D, and by reference number 124-3, the scheduling system may determine a target state for a cloud resource, based on a time when the evaluation associated with the cloud resource is being performed. As shown by reference number 124-3, the evaluation may be performed at a third time (e.g., mid-day on Thursday) that corresponds to an uptime window of a continuous schedule, whereby the target state of the cloud resource is a running state. Accordingly, at the third time, the scheduling system may either resume the cloud resource if the current state of the cloud resource is suspended, or may maintain the current state of the cloud resource if the current state of the cloud resource is running.

As shown in FIG. 1D, and by reference number 124-4, the scheduling system may determine a target state for a cloud resource, based on a time when the evaluation associated with the cloud resource is being performed. As shown by reference number 124-4, the evaluation may be performed at a fourth time (e.g., mid-day on Saturday) that corresponds to a downtime window of a continuous schedule, whereby a target state of the cloud resource is a suspended state. Accordingly, at the fourth time, the scheduling system may either suspend the cloud resource if the current state of the cloud resource is running, or may maintain the current state of the cloud resource if the current state of the cloud resource is suspended.

Figure 1E:
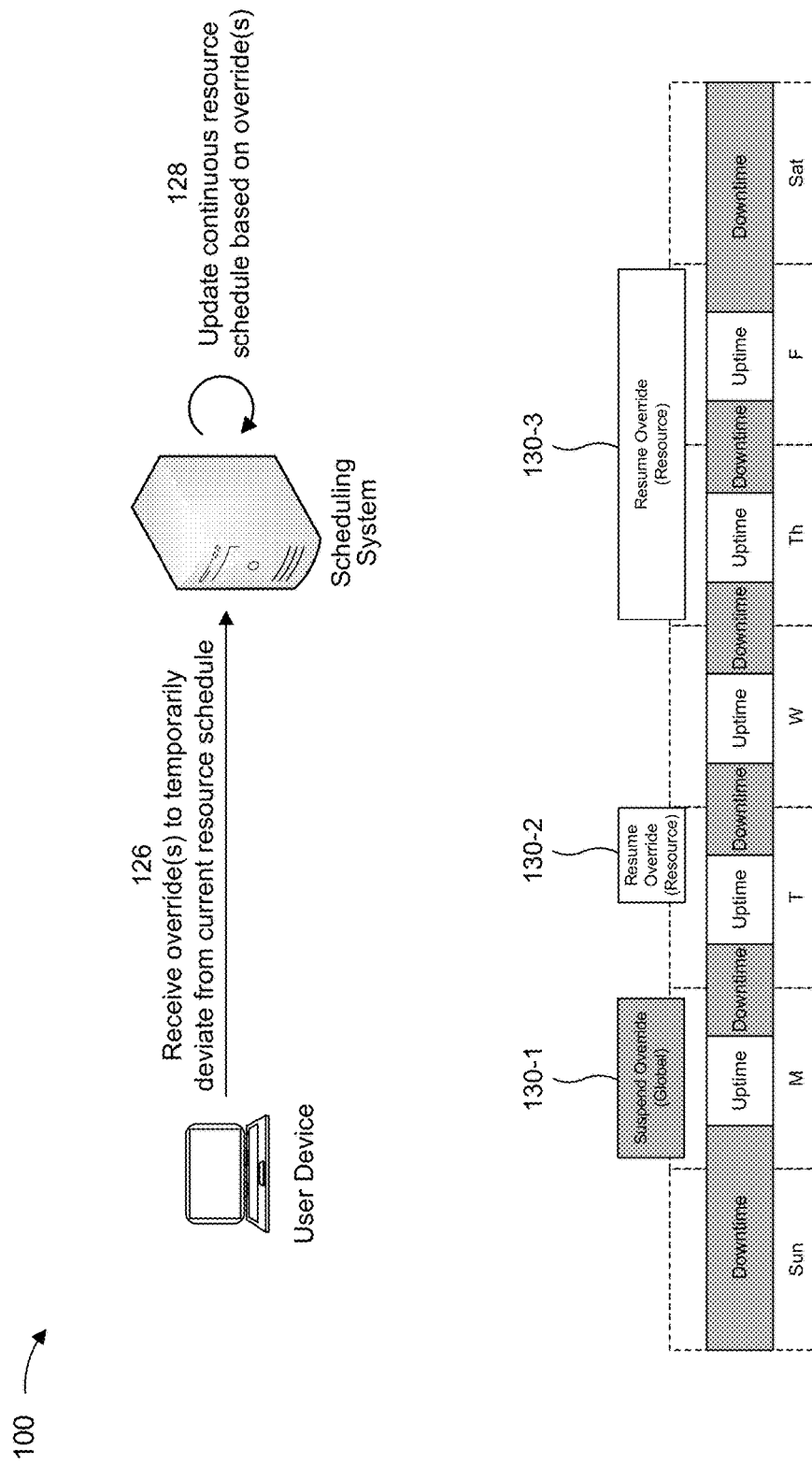

As shown in FIG. 1E, and by reference number 126, the scheduling system may receive, from the user device, one or more overrides to temporarily deviate from a current schedule associated with a cloud resource (e.g., due to special circumstances, such as an engineering team needing cloud resources to be online for two hours while performing an after-hours release, a holiday on a weekday, or the like). In other words, for example, the scheduling system may receive, from the user device, one or more overrides to define a scheduled state associated with one or more cloud resources that may take precedence over a target state associated with a current schedule of the one or more cloud resources during a temporary time window specified in the one or more overrides. In some implementations, the one or more overrides may include a resource override (e.g., a resume override and/or a resource suspend override) and/or a global override (e.g., a global resume override and/or a global suspend override). In some implementations, a global override may be applicable to all cloud resources in a cloud infrastructure that includes the cloud resource. In some implementations, a resource-specific override may be applicable to only the cloud resource associated with the resource-specific override. For example, a resource resume override may be an override that may indicate that a state of a specific cloud resource in a cloud computing environment is to be a running state for a given time period, and a global resume override may be an override that may indicate that a state of each cloud resource in a cloud computing environment is to be changed to a running state for a given time period.

In another example, a resource suspend override may be an override that may indicate that a state of a specific cloud resource in a cloud computing environment is to be a suspended state for a given time period, and a global suspend override may be an override that may indicate that a state of each cloud resource in a cloud computing environment is to be a suspended state for a given time period. In some implementations, a global resume override, a resource resume override, a global suspend override, and/or a resource suspend override may be associated with a given time period that the override is to be in effect. In some implementations, a resource resume override and/or a resource suspend override may have a higher priority than a global resume override and/or a global suspend override. For example, if a time period of a resource resume override overlaps with a time period of a global suspend override or a global resume override, the resource resume override takes precedence. For example, if a time period of a resource suspend override overlaps with a time period of a global resume override or a global suspend override, the resource suspend override takes precedence.

As shown in FIG. 1E, and by reference number 128, the scheduling system may update one or more schedules associated with one or more cloud resources based on one or more overrides. In some implementations, to update the one or more schedules associated with the one or more cloud resources based on one or more overrides, the scheduling system may compare a time period of each of the one or more overrides with each of the one or more schedules associated with the one or more cloud resources. For example, the scheduling system may receive a global resume override associated with a time period from 7:00 am to 7:00 pm on Monday, and continuous schedules associated with a set of cloud resources may indicate whether each cloud resource, included in the set of cloud resources, is to be in a suspended state or a running state from 7:00 am to 7:00 pm on Monday. In this example, the scheduling system may update the continuous schedules associated with the set of cloud resources such that a target state of each cloud resource, included in the set of cloud resources, is a running state from 7:00 am to 7:00 pm on Monday. Furthermore, the scheduling system may update the one or more schedules associated with one or more cloud resources with one or more resource resume overrides, one or more resource suspend override, and/or global suspend overrides in a similar manner as described above in connection with global resume overrides, also taking into consideration the relative priorities of the overrides (e.g., with resource overrides generally taking precedence over global override).

As shown in FIG. 1E, reference number 130-1 depicts an example in which the scheduling system may update a continuous schedule (e.g., based on a scheduling tag that indicates "uptime_schedule: M-F@7-19," which defines uptime windows for a cloud resource on Monday through Friday from 7:00 am to 7:00 pm), associated with a cloud resource based on a global suspend override (e.g., shown as overriding an uptime window of the continuous schedule). For example, the global suspend override may be provided by the user device based on a holiday on Monday, where all cloud resources should be suspended throughout the day to conserve resources. In the illustrated example, the cloud resource would normally be resumed during the first uptime window on Sunday night entering into Monday morning. However, the global suspend override (e.g., due to the holiday on Monday) overrides the uptime window such that the target state of the cloud resource is changed to suspended. The cloud resource remains suspended for the duration of the global suspend override and the subsequent downtime window on Monday night and Tuesday morning until the cloud resource is resumed based on the regular schedule on Tuesday morning due to the uptime window in the regular schedule that is not subject to any overrides.

As shown in FIG. 1E, reference number 130-2 depicts an example in which the scheduling system may update a schedule associated with a cloud resource based on a resource resume override (e.g., shown as overriding an uptime window and a downtime window of a continuous schedule). For example, the resource resume override may be provided by the user device based on an engineer on an application team anticipating a need for a specific cloud resource to stay running beyond normal business hours (e.g., after a time that the cloud resource would normally be suspended) for a given duration without any interruption. In the illustrated example, the specific cloud resource is in a running state (e.g., mid-day on Tuesday) and would normally be suspended during the third downtime window entering into Tuesday evening. While the resume resource override overrides the uptime window, the target state of the cloud resource is not changed (e.g., the target state of the specific cloud resource is the same during the uptime window in the regular schedule and during the resource resume override). However, the resource resume override overrides the downtime window such that the target state of the specific cloud resource is changed to running. The specific cloud resource remains running for the duration of the resource resume override until the specific cloud resource is suspended based on the regular schedule on Tuesday evening due to the downtime window in the regular schedule that is not subject to any overrides.

As shown in FIG. 1E, and by reference number 130-3, the scheduling system may update a schedule associated with a cloud resource based on a resource resume override (e.g., shown as overriding two uptime windows and three downtime windows of a continuous schedule). For example, the resource resume override may be provided by the user device based on an engineering team attempting to replicate a production issue, which requires a specific cloud resource to run without interruption for a given duration. In the illustrated example, the specific cloud resource would normally be in a suspended state on Thursday morning. However, the resource resume override overrides the fourth downtime window such that the target state of the specific cloud resource is changed to running, and the scheduling system aligns the current state of the specific cloud resource to a running state at the next scheduled point-in-time evaluation (e.g., the scheduling system resumes the cloud resource). The specific cloud resource remains running for the duration of the resource resume override (e.g., during the fourth uptime window, the fifth downtime window, the fifth uptime window, and a portion of the sixth downtime window) until the specific cloud resource is suspended based on the regular schedule on Friday evening due to the downtime window in the regular schedule that is not subject to any overrides.

Thus, in some implementations, the scheduling system may use one or more overrides to update one or more schedules associated with one or more cloud resources without adjusting any of the scheduling tags that define the one or more schedules. For example, each of the scheduling adjustments described above in connection with reference numbers 130-1, 130-2, and 130-3 was implemented without adjusting the scheduling tag of the cloud resource. For example, the cloud resource maintains the regular scheduling tag (e.g., "uptime_schedule: M-F@7-19") and entering the next week the cloud resource will continue to be resumed and suspended every weekday as normal. Thus, in some implementations, overrides may provide additional flexibility with managing resource downtime to the cloud stewards as well as developers without needing to re-configure or toggle the tagged schedule on cloud resources.

Figure 1F:
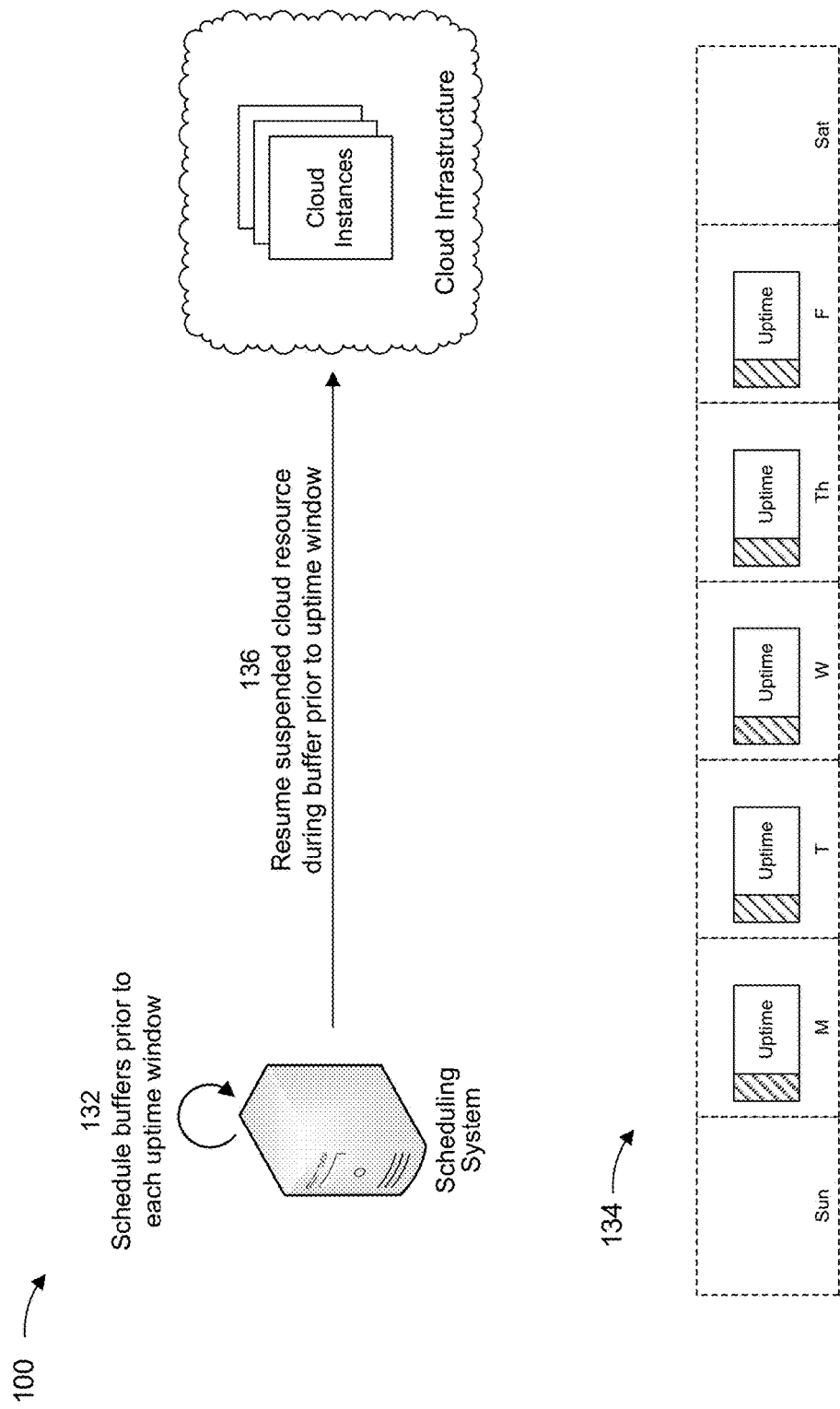

As shown in FIG. 1F, and by reference number 132, the scheduling system may schedule one or more buffers prior to one or more uptime windows. In some implementations, the one or more buffers may extend a time period of one or more existing uptime windows for a given time period. For example, the one or more buffers may extend a time period of one or more existing uptime windows of a schedule associated with a cloud resource for a time period that allows the cloud resource to be fully running by a start time of the existing one or more uptime windows. For example, if a cloud resource takes thirty minutes to spin up (e.g., transition from a suspended state to a running state), and an existing uptime window of a schedule is 7:00 am on Monday, the scheduling system may update the schedule with buffer that extends the existing uptime window to 6:30 am on Monday, which allows the cloud resource to be fully running by 7:00 on Monday. In some implementations, the one or more buffers may extend a time period of one or more resource resume overrides and/or one or more global resume overrides. Thus, in some implementations, the one or more buffers may be utilized for system control to extend a time period associated with one or more resource resume overrides, one or more global resume overrides, and/or one or more uptime windows. In some implementations, a time period associated with the one or more buffers may be based on an estimate of an average resumption time of one or more cloud resources. In some implementations, a time period associated with a resource override, a global override, and/or an uptime window may be extended directly rather than using a buffer. However, for example, extending a time period directly may lead to configuration difficulties associated with the time extension. For example, if a configuration change is based on a time extension, the resulting time series would have to be compared to the original time series to enable the configuration change to be applied correctly. Thus, in some limitations, using a buffer to extend a time period rather than extending a time period directly may enable easier configuration changes associated with a time extension.

As shown in FIG. 1F, and by reference number 134, the scheduling system may schedule a buffer (sometimes called a buffer time period) prior to each uptime window associated with a cloud resource (e.g., shown as lined boxes adjacent to existing uptime windows in FIG. 1F). As shown, the buffer that is scheduled prior to each uptime window may be used to start the uptime earlier than initially scheduled to account for the estimated time for the cloud resource to start up. In this way, by using separate scheduling constructs to represent the uptime window and the buffer that precedes the uptime window, the buffer that extends the uptime duration is clearly represented as a system modification rather than part of the default schedule for the cloud resource (e.g., the continuous schedule determined from the scheduling tag for the cloud resource). Furthermore, if the estimated time to spin up a cloud resource changes, the buffer can be modified because there is a distinction between a user-indicated start time and a start time at the beginning of the buffer.

As shown in FIG. 1F, and by reference number 136, the scheduling system may resume one or more suspended cloud resources during one or more buffers (e.g., one or more time periods of the one or more buffers) prior to one or more uptime windows. For example, if a cloud resource takes thirty minutes to spin up (e.g., transition from a suspended state to a running state) after being provisioned and the continuous schedule for the cloud resource includes an uptime window that starts at 7:00 am Monday, then the scheduling system may resume the cloud resource during a time period of the buffer prior to the uptime window (e.g., the scheduling system may change a suspended state of the cloud resource to a running state at 6:30 am, which allows the cloud resource to be fully running by 7:00 am on Monday). In other words, if the scheduling system performs a point-in-time evaluation for a cloud resource and determines that a current scan time corresponds to a buffer period that precedes an uptime window, the scheduling system may resume the cloud resource if the cloud resource is in a suspended state. The scheduling system may resume one or more suspended cloud resources during one or more buffers (e.g., one or more time periods of the one or more buffers) prior to one or more resource resume overrides and/or one or more global resume overrides in a similar manner as described above.

Figure 1G:
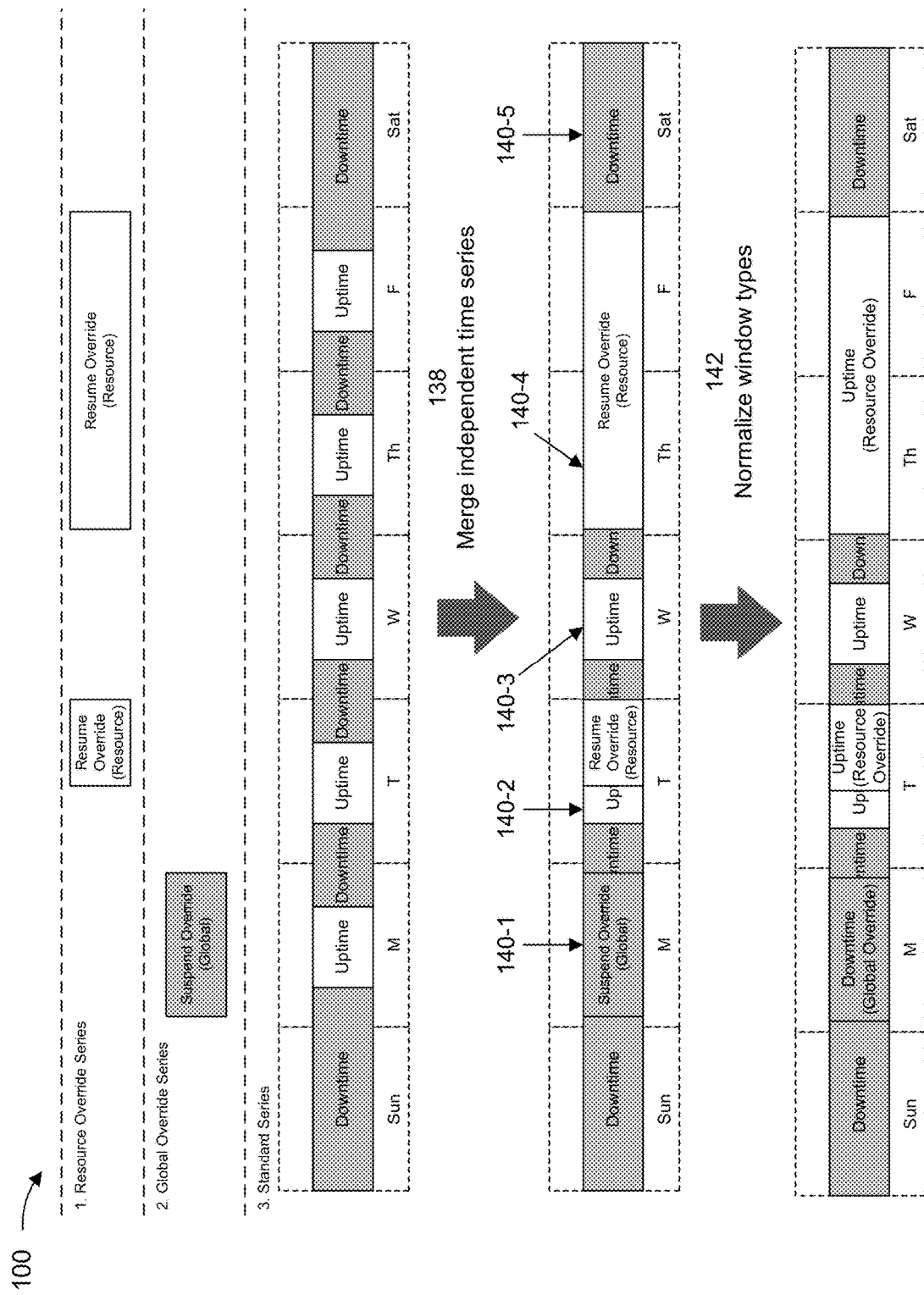

As shown in FIG. 1G, and by reference number 138, the scheduling system may merge multiple independent time series associated with a cloud resource. In some implementations, the independent time series associated with a cloud resource may include a first independent time series (e.g., a resource override series), a second independent time series (e.g., a global override series), and a third independent time series (e.g., a standard series). In some implementations, a resource override series may include one or more resource resume overrides and/or one or more resource suspend overrides (described above in connection with FIG. 1E and elsewhere herein). In some implementations, a global override series may include one or more global resume overrides and/or one or more global suspend overrides (described above in connection with FIG. 1E and elsewhere herein). In some implementations, a standard series may include one or more uptime windows and/or one or more downtime windows, such as the continuous schedule described in connection with reference number 112 of FIG. 1B, in connection with reference number 118 of FIG. 1C, and elsewhere herein. In some implementations, priority levels may be assigned to the resource override series, the global override series, and the standard series (e.g., the resource override series may have a higher priority than the global override series, and the global override series may have a higher priority than the standard series), as described elsewhere herein. In some implementations, one or more buffers (described above in connection with FIG. 1F and elsewhere herein) may also be included in the resource override series, the global override series, and/or the standard series (e.g., prior to uptime windows, global resume overrides, and/or resource resume overrides).

In some implementations, the scheduling system may merge the one or more independent time series to generate a merged time series based on the one or more independent time series. For example, referring to FIG. 1G, the standard series includes multiple uptime windows and multiple downtime windows, the global override series includes a global suspend override, and the resource override series includes multiple resource resume overrides. The scheduling system may overlay each of the standard series, the global override series, and the resource override series on one another to generate the merged time series. For example, referring to FIG. 1G, the scheduling system overlays each of the standard series, the global override series, and the resource override series on one another to generate the merged time series, and the merged time series includes the multiple uptime windows, the multiple downtime windows, the global suspend override, and the multiple resource resume overrides.

As shown in FIG. 1G, and by reference number 140-1, at a point-in-time indicated by the arrow, a cloud resource should be stopped based on the global suspend override. For example, if the scheduling system performs a point-in-time evaluation of the schedule at this point-in-time, the scheduling system may determine that the target state for the cloud resource at the current scan time is the suspended state based on the current scan time being within the global suspend override of the global suspend series.

As shown in FIG. 1G, and by reference number 140-2, at a point-in-time indicated by the arrow, a cloud resource should be running based on an uptime window of the standard series. For example, if the scheduling system performs a point-in-time evaluation of the schedule at this point-in-time, the scheduling system may determine that the target state for the cloud resource at the current scan time is the running state based on the current scan time being within the uptime window of the standard series.

As shown in FIG. 1G, and by reference number 140-3, at a point-in-time indicated by the arrow, a cloud resource should be running based on an uptime window of the standard series. For example, if the scheduling system performs a point-in-time evaluation of the schedule at this point-in-time, the scheduling system may determine that the target state for the cloud resource at the current scan time is the running state based on the current scan time being within the uptime window of the standard series.

As shown in FIG. 1G, and by reference number 140-4, at a point-in-time indicated by the arrow, a cloud resource should be running based on one of the resource resume overrides. For example, if the scheduling system performs a point-in-time evaluation of the schedule at this point-in-time, the scheduling system may determine that the target state for the cloud resource at the current scan time is the running state based on the current scan time being within the resource resume override of the resource override series.

As shown in FIG. 1G, and by reference number 140-5, at a point-in-time indicated by the arrow, a cloud resource should be stopped based on a downtime window of the standard series. For example, if the scheduling system performs a point-in-time evaluation of the schedule at this point-in-time, the scheduling system may determine that the target state for the cloud resource at the current scan time is the suspended state based on the current scan time being within the downtime window of the standard series.

As shown in FIG. 1G, and by reference number 142, the scheduling system may normalize window types. For example, any buffers may be normalized to an uptime window, any resource resume overrides may be normalized to an uptime window, any resource suspend overrides may be normalized to a downtime window, any global resume overrides may be normalized to an uptime window, and any global suspend overrides may be normalized to a downtime window. For example, referring to FIG. 1G, the global suspend override is normalized to a downtime window, the first resource resume override is normalized to an uptime window, and the second resource resume override is normalized to an uptime window.

Figure 1H:
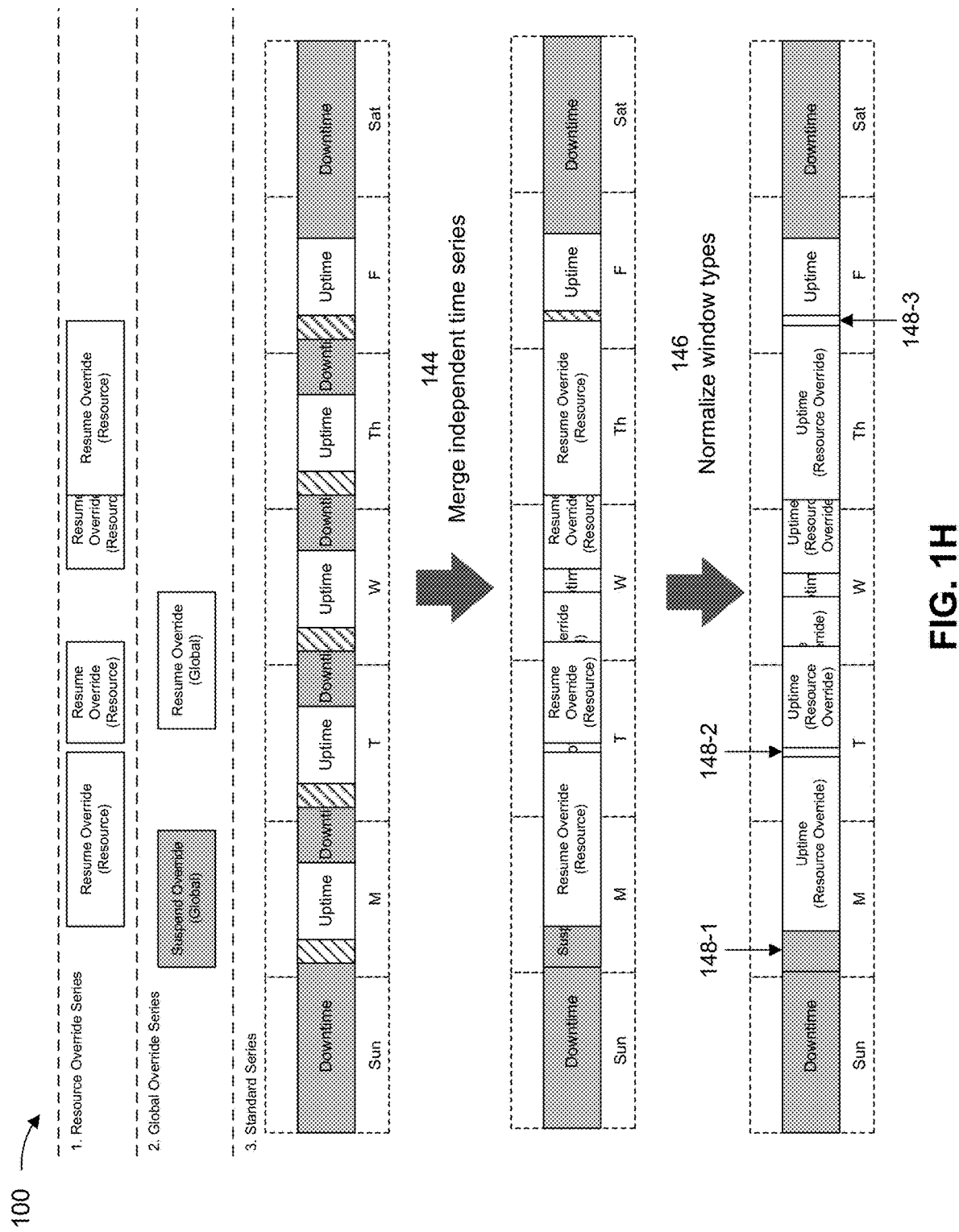

As shown in FIG. 1H, and by reference number 144, the scheduling system may merge multiple independent time series associated with a cloud resource as described in connection with reference number 138 of FIG. 1G. For example, referring to FIG. 1H, the standard series includes multiple uptime windows, downtime windows, and buffers at transitions from the downtime windows to the uptime windows, the global override series includes a global suspend override and a global resume override, and the resource override series includes multiple resource resume overrides (including two that overlap in time). For example, referring to FIG. 1H, the scheduling system overlays each of the standard series, the global override series, and the resource override series on one another to generate the merged time series, and the merged time series includes some of the multiple uptime windows, downtime windows, and buffers (e.g., as shown, the global suspend override, the global resume override and some of the resource resume overrides override some of the uptime windows, downtime windows, and buffers based on priority), a portion of the global suspend override (e.g., the portion that does not overlap with the resource resume override based on priority), a portion of the global resume override (e.g., the portion that does not overlap with resource resume override), and the resource resume overrides (which take precedence over the standard time series and the global override series).

As shown in FIG. 1H, and by reference number 146, the scheduling system may normalize window types as described above in connection with reference number 142 of FIG. 1G. For example, referring to FIG. 1H, the portion of the global suspend override is normalized to a downtime window, the portion of the global resume override is normalized to an uptime window, and the resource resume overrides are normalized to uptime windows.

As shown in FIG. 1H, and by reference number 148-1, at a point-in-time indicated by the arrow, a cloud resource should be stopped based on a downtime window corresponding to the global suspend override. For example, if the scheduling system performs a point-in-time evaluation of the schedule at this point-in-time, the scheduling system may determine that the target state for the cloud resource at the current scan time is the suspended state based on the current scan time being within the downtime window of the global suspend override. Accordingly, at this point-in-time, the scheduling system may suspend the cloud resource if the current state of the cloud resource is running.

As shown in FIG. 1H, and by reference number 148-2, at a point-in-time indicated by the arrow, a cloud resource should be running based on an uptime window of the standard series. For example, if the scheduling system performs a point-in-time evaluation of the schedule at this point-in-time, the scheduling system may determine that the target state for the cloud resource at the current scan time is the running state based on the current scan time being within the uptime window of the standard series. Accordingly, at this point-in-time, the scheduling system may resume the cloud resource if the current state of the cloud resource is suspended.

As shown in FIG. 1H, and by reference number 148-3, at a point-in-time indicated by the arrow, a cloud resource should be stopped based on an uptime window of a buffer of the standard series. For example, if the scheduling system performs a point-in-time evaluation of the schedule at this point-in-time, the scheduling system may determine that the target state for the cloud resource at the current scan time is the running state based on the current scan time being within the uptime window of the buffer of the standard series. Accordingly, at this point-in-time, the scheduling system may resume the cloud resource if the current state of the cloud resource is suspended.

Figure 1I:
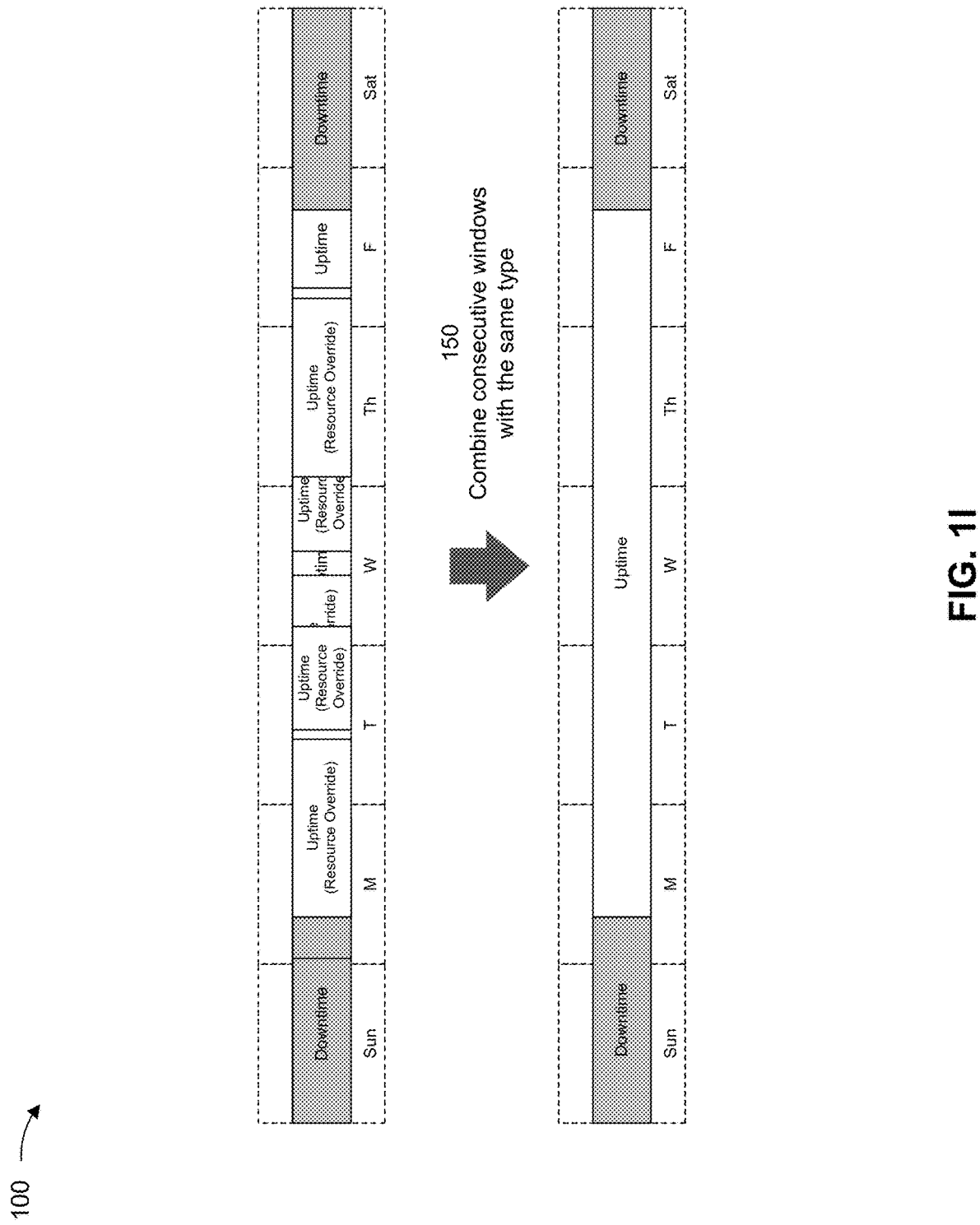

As shown in FIG. 1I, and by reference number 150, the scheduling system may combine consecutive windows with the same window type to simplify the representation of the merged time series. For example, the scheduling system may combine consecutive downtime windows of a merged time series with one another and/or may combine consecutive uptime windows of a merged time series with one another to generate a combined time series. For example, referring to FIG. 1I, the scheduling system combines consecutive downtime windows with one another and consecutive uptime windows with one another to generate a combined time series. For example, referring to FIG. 1I, the combined time series includes a single uptime window from 7:00 am Monday to 7:00 pm Friday, a first downtime window from midnight on Sunday to 7:00 am on Monday, and a second downtime window from 7:00 pm Friday to midnight on Sunday. Accordingly, the scheduling system may determine, at a current scan time, a target state for a cloud resource based on the combined time series, and may align a current state of the cloud resource with the target state in a similar manner as described elsewhere herein.

Thus, in some implementations, the scheduling system may perform operations (e.g., resume operations or suspend operations) on a cloud resource based on a fully realized continuous schedule associated with the cloud resource.

In some implementations, if a cloud resource is running when the cloud resource should be suspended, the scheduling system may automatically suspend the cloud resource at a next scheduled point-in-time evaluation. Similarly, if a cloud resource is suspended when the cloud resource should be running, the scheduling system may automatically resume the cloud resource at a next scheduled point-in-time evaluation. As such, for example, if a scheduling issue prevents the scheduling system from performing an operation (e.g., a resume operation or a suspend operation) specified by a continuous schedule, the scheduling system may, once the scheduling issue is resolved, automatically perform the operation to align the current state with the target state at a next scheduled point-in-time evaluation.

Additionally, in some implementations, if a new instance is provisioned in the cloud computing environment after a scheduled stop time, the scheduling system may automatically suspend the cloud resources associated with the instance at a next scheduled point-in-time evaluation.

Additionally, in some implementations, the scheduling system may use a schedule tag that may be applied directly on the cloud resources in the cloud computing environment. For example, the schedule tag may include external metadata (e.g., external to the cloud resource) that defines a continuous schedule of the cloud resource. In some implementations, the schedule tag may use a syntax that is compatible with all cloud resource types, including RDS cloud resources. In this way, the scheduling system may create a custom schedule associated with all cloud resource types, including database cloud resources.

Furthermore, in some implementations, the scheduling system may enable advanced scheduling techniques, such as global overrides or resource-specific overrides to temporarily deviate from the standard schedule (e.g., during off-hours, such as holidays or non-business hours of a workday) and buffer times that may precede each time when the cloud resource needs to be available to account for delays that may occur in starting the cloud resource. In other words, in some implementations, system-level modifications may modify a schedule associated with a cloud resource rather than resource-level modifications. This may further allow computing resources, that would otherwise be used to run a cloud resource, to be used elsewhere in the cloud computing environment.

As indicated above, FIGS. 1A-1I are provided as an example. Other examples may differ from what is described with regard to FIGS. 1A-1I.

Figure 2:
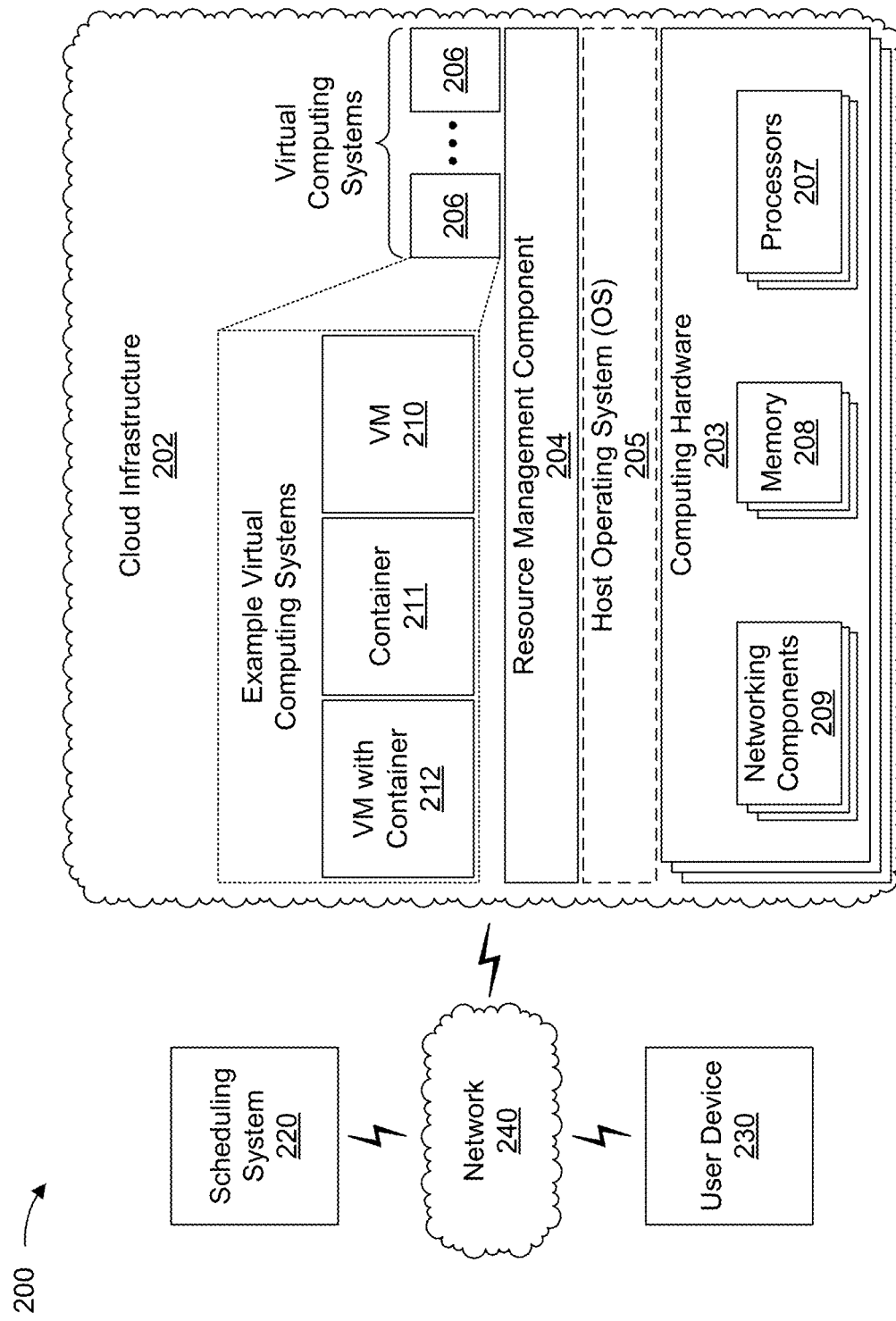

FIG. 2 is a diagram of an example environment 200 in which systems and/or methods described herein may be implemented. As shown in FIG. 2, environment 200 may include a cloud infrastructure 202. The cloud infrastructure 202 may include one or more elements 203-212, as described in more detail below. As further shown in FIG. 2, environment 200 may include a scheduling system 220, a user device 230, and/or a network 240. Devices and/or elements of environment 200 may interconnect via wired connections and/or wireless connections.

The cloud infrastructure 202 may include computing hardware 203, a resource management component 204, a host operating system (OS) 205, and/or one or more virtual computing systems 206. The cloud infrastructure 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the cloud infrastructure 202 may execute within a cloud computing environment, and/or may be hosted within a cloud computing environment, in some implementations, the cloud infrastructure 202 may be partially cloud-based. For example, the cloud infrastructure 202 may include one or more devices that are not part of a cloud computing environment, such as device 300 of FIG. 3, which may include a standalone server or another type of computing device.

The scheduling system 220 may include one or more devices capable of receiving, generating, storing, processing, providing, and/or routing information associated with continuous scheduling for automated suspension and resumption of cloud resources, as described elsewhere herein. The scheduling system 220 may include a communication device and/or a computing device. For example, the scheduling system 220 may include a server, such as an application server, a client server, a web server, a database server, a host server, a proxy server, a virtual server (e.g., executing on computing hardware), or a server in a cloud computing system. In some implementations, the scheduling system 220 may include computing hardware used in a cloud computing environment. For example, the scheduling system 220 may assist with continuous scheduling for automated suspension and resumption of cloud resources, as described in more detail elsewhere herein.

The user device 230 may include one or more devices capable of receiving, generating, storing, processing, and/or providing information associated with continuous scheduling for automated suspension and resumption of cloud resources, as described elsewhere herein. The user device 230 may include a communication device and/or a computing device. For example, the user device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 240 may include one or more wired and/or wireless networks. For example, the network 240 may include a cellular network, a public land mobile network (PLMN), a local area network (LAN), a wide area network (WAN), a private network, the Internet, and/or a combination of these or other types of networks. The network 240 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
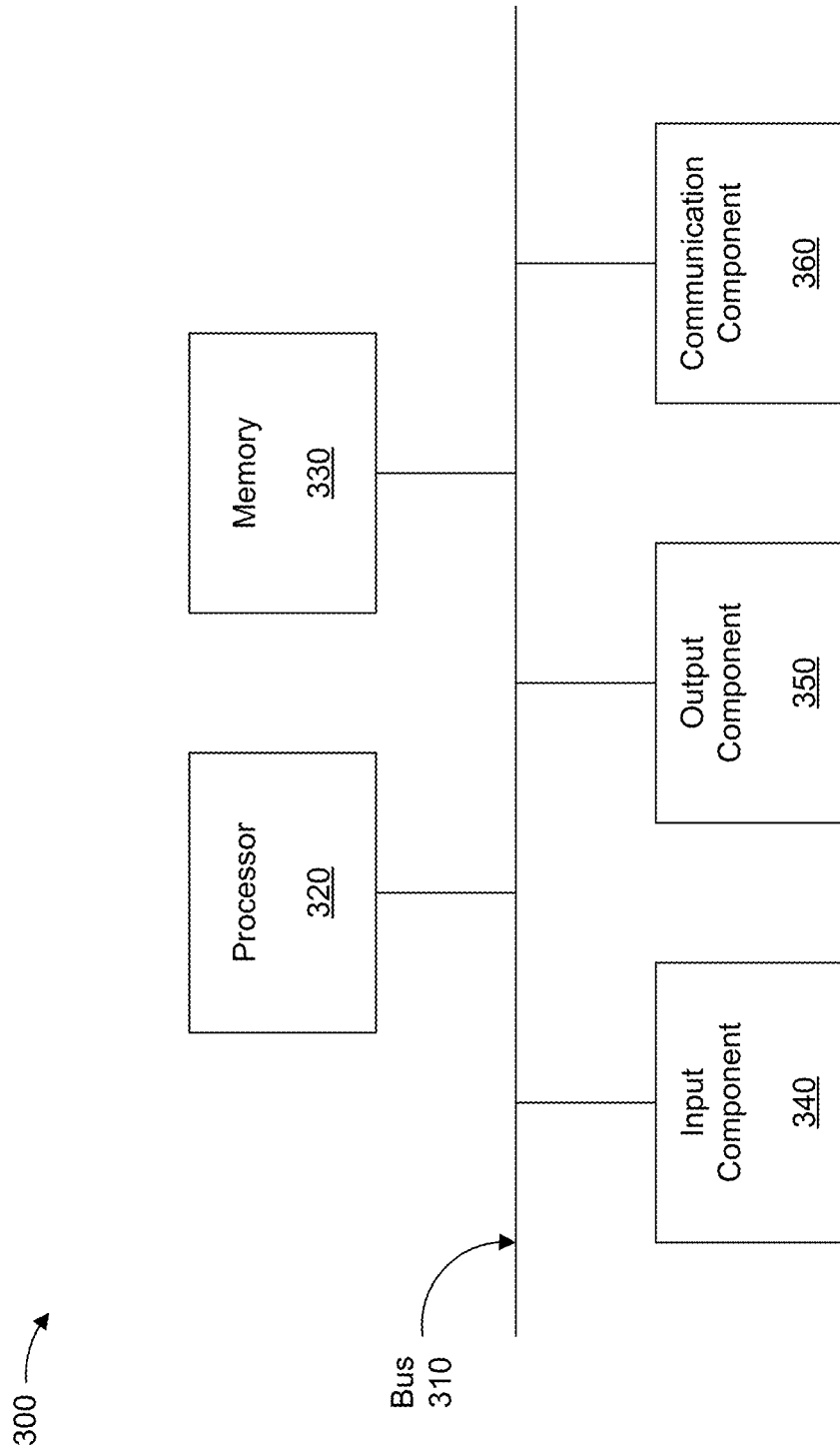

FIG. 3 is a diagram of example components of a device 300 associated with continuous scheduling for automated suspension and resumption of cloud resources. The device 300 may correspond to the scheduling system 220 and/or the user device 230. In some implementations, the scheduling system 220 and/or the user device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with continuous scheduling for automated suspension and resumption of cloud resources. In some implementations, one or more process blocks of FIG. 4 may be performed by the scheduling system 220. In some implementations, one or more process blocks of FIG. 4 may be performed by another device or a group of devices separate from or including the scheduling system 220, such as the user device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a scheduling tag to define a custom schedule that includes one or more uptime windows for a cloud resource over a scheduling period. In some implementations, the scheduling tag includes a value to express the one or more uptime windows using a syntax that is compatible with an external metadata format supported by the cloud resource (block 410). For example, the scheduling system 220 (e.g., using processor 320, memory 330, input component 340, and/or communication component 360) may receive a scheduling tag to define a custom schedule that includes one or more uptime windows for a cloud resource over a scheduling period.

In some implementations, the scheduling tag includes a value to express the one or more uptime windows using a syntax that is compatible with an external metadata format supported by the cloud resource, as described above in connection with reference numbers 102, 104-1, 104-2, and 104-3 of FIG. 1A. As an example, a key of the scheduling tag may indicate that the scheduling tag defines an uptime schedule associated with a cloud resource (e.g., a duration or a time period when the cloud resource should be in a running state), and a value of the scheduling tag may define one or more uptime windows associated with the uptime schedule (e.g., using a multi-day syntax, a single-day syntax, or an overnight syntax).

As further shown in FIG. 4, process 400 may include determining a regular continuous schedule for the cloud resource that recurs over multiple scheduling periods based on the one or more uptime windows defined in the scheduling tag. In some implementations, the regular continuous schedule includes the one or more uptime windows and one or more downtime windows that cover any time periods during the scheduling period that are not covered by the one or more uptime windows (block 420). For example, the scheduling system 220 (e.g., using processor 320 and/or memory 330) may determine a regular continuous schedule for the cloud resource that recurs over multiple scheduling periods based on the one or more uptime windows defined in the scheduling tag. In some implementations, the regular continuous schedule includes the one or more uptime windows and one or more downtime windows that cover any time periods during the scheduling period that are not covered by the one or more uptime windows, as described above in connection with reference number 112 of FIG. 1B and reference number 118 of FIG. 1C. As an example, the scheduling system 220 may receive a scheduling tag that defines one or more uptime windows in a scheduling period, define downtime windows corresponding to any time periods that are not covered by an uptime window, and combine the one or more uptime windows and the one or more downtime windows into a continuous schedule that indicates time periods when the cloud resource is to be in a running state and time periods when the cloud resource is to be in a suspended state, which collectively cover an entire scheduling period associated with the cloud resource. As another example, the scheduling system 220 may receive a scheduling tag that defines one or more downtime windows in a scheduling period, define uptime windows corresponding to any time periods that are not covered by a downtime window, and similarly combine the one or more uptime windows and the one or more downtime windows into a continuous schedule that covers the entire scheduling period.

In some implementations, the regular continuous schedule includes the one or more uptime windows and one or more downtime windows that cover any time periods during the scheduling period that are not covered by the one or more uptime windows.

As further shown in FIG. 4, process 400 may include determining, at a current scan time, whether a target state for the cloud resource is a running state or a suspended state based on the one or more uptime windows and the one or more downtime windows included in the regular continuous schedule (block 430). For example, the scheduling system 220 (e.g., using processor 320 and/or memory 330) may determine, at a current scan time, whether a target state for the cloud resource is a running state or a suspended state based on the one or more uptime windows and the one or more downtime windows included in the regular continuous schedule, as described above in connection with reference number 120 of FIG. 1D. As an example, the scheduling system 220 may determine that a target state for a cloud resource is a running state based on a current scan time being within an uptime window of the continuous schedule or may determine that a target state for a cloud resource is a suspended state based on the current scan time being within a downtime window of the continuous schedule.

As further shown in FIG. 4, process 400 may include aligning a current state of the cloud resource with the target state (block 440). For example, the scheduling system 220 (e.g., using processor 320 and/or memory 330) may align a current state of the cloud resource with the target state, as described above in connection with reference number 122 of FIG. 1D. As an example, the scheduling system may resume a cloud resource based on a determination, at a current scan time, that the cloud resource is in a suspended state during an uptime window when the cloud resource should be running. In another example, the scheduling system may suspend the cloud resource based on a determination, at the current scan time, that the cloud resource is in the running state during a downtime window when the cloud resource should be suspended.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1I. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automated suspension and resumption of cloud resources based on continuous scheduling, the system comprising:
   one or more memories; and
   one or more processors, coupled to the one or more memories, configured to:

determine a regular continuous schedule for a cloud resource,
wherein the regular continuous schedule includes a plurality of windows including at least one first window and at least one second window,
wherein the at least one second window covers time periods of a scheduling period that are not covered by the at least one first window, and
wherein each of the plurality of windows has a corresponding target state for the cloud resource, each target state corresponding to uptime or downtime for the cloud resource;
align the cloud resource with a target state for the cloud resource corresponding to a target window based at least in part on a determination at a first scan time whether the cloud resource is in alignment with the target state;
determine, at a second scan time after the first scan time and within the target window, whether the cloud resource is in alignment with the target state; and
align, based at least in part on the determination at the second scan time, the cloud resource with the target state.

2. The system of claim 1, wherein the target window comprises one or more uptime windows, and wherein the one or more processors, to align the cloud resource with the target state based at least in part on the determination at the second scan time, are configured to:
determine that the target state is a running state; and
resume the cloud resource based on determining, at the second scan time, that the cloud resource is in a suspended state.

3. The system of claim 1, wherein the target window comprises one or more downtime windows, and wherein the one or more processors, to align the cloud resource with the target state based at least in part on the determination at the second scan time, are configured to:
determine that the target state is a suspended state; and
suspend the cloud resource based on determining, at the second scan time, that the cloud resource is in a running state.

4. The system of claim 1, wherein the one or more processors are configured to perform a point-in-time evaluation to determine the target state and align a current state of the cloud resource corresponding to the target window with the target state at periodic intervals.

5. The system of claim 1, wherein the one or more processors are configured to receive a scheduling tag corresponding to the cloud resource, and wherein a value of the scheduling tag defines one or more uptime windows according to a multi-day syntax that specifies a starting time and an ending time associated with multiple days, a single-day syntax that specifies a starting time and an ending time associated with a single day, or an overnight syntax that specifies a starting time on a first day and an ending time on a second day.

6. The system of claim 1, wherein the one or more processors are further configured to:
receive an override to define a scheduled state for the cloud resource corresponding to the target window that takes precedence over the target state during a temporary time window specified in the override; and
align a current state of the cloud resource corresponding to the target window with the scheduled state defined in the override.

7. The system of claim 6, wherein the override is a global override applicable to all cloud resources in a cloud infrastructure that includes the cloud resource.

8. The system of claim 6, wherein the override is a resource-specific override applicable to only the cloud resource associated with the override.

9. The system of claim 1, wherein the one or more processors are further configured to:
adjust the regular continuous schedule to include a buffer period that is associated with a running state of the cloud resource corresponding to the target window.

10. The system of claim 9, wherein the buffer period has a duration that is based on an estimated time required for the cloud resource corresponding to the target window to start up.

11. A method for continuous scheduling for cloud resources, comprising:
determining, by a scheduling system, a regular continuous schedule for a cloud resource that recurs over multiple scheduling periods,
wherein the regular continuous schedule includes a plurality of windows including at least one first window and at least one second window, and
wherein each of the plurality of windows has a corresponding target state for the cloud resource, each target state corresponding to uptime or downtime for the cloud resource;
aligning, by the scheduling system, the cloud resource with a target state for the cloud resource corresponding to a target window based at least in part on a determination at a first scan time whether the cloud resource is in alignment with the target state;
determining, by the scheduling system and at a second scan time after the first scan time and within the target window, whether the cloud resource is in alignment with the target state for the cloud resource; and
aligning, by the scheduling system and based at least in part on the determination at the second scan time, the cloud resource with the target state.

12. The method of claim 11, further comprising performing a point-in-time evaluation to determine the target state and align a current state of the cloud resource corresponding to the target window with the target state at periodic intervals.

13. The method of claim 11, further comprising:
receiving an override to define a scheduled state for the cloud resource corresponding to the target window that takes precedence over the target state during a temporary time window specified in the override; and
aligning a current state of the cloud resource corresponding to the target window with the scheduled state defined in the override.

14. The method of claim 13, wherein the override is a global override applicable to all cloud resources in a cloud infrastructure that includes the cloud resource or a resource-specific override applicable to only the cloud resource associated with the override.

15. The method of claim 11, further comprising:
adjusting the regular continuous schedule to include a buffer period that is associated with a running state.

16. A non-transitory computer-readable medium storing a set of instructions, the set of instructions comprising:
one or more instructions that, when executed by one or more processors of a scheduling system, cause the scheduling system to:
receive a scheduling tag to define a custom schedule for a cloud resource over a scheduling period, determine a regular continuous schedule for the cloud resource based on the scheduling tag;

determine, at a first scan time and within a target window of a plurality of windows corresponding to the regular continuous schedule, whether the cloud resource is in alignment with a target state for the cloud resource corresponding to the target window;

align, based at least in part on the determination at the first scan time, the cloud resource with the target state corresponding to the target window;

determine, at a second scan time after the first scan time and within the target window, whether the cloud resource is in alignment with the target state for the cloud resource corresponding to the target window in accordance with the regular continuous schedule; and align, based at least in part on the determination at the second scan time, the cloud resource with the target state.

17. The non-transitory computer-readable medium of claim 16, wherein the one or more instructions, that cause the scheduling system to align the cloud resource with the target state based at least in part on the determination at the second scan time, cause the scheduling system to:

determine that the target state is a running state; and resume the cloud resource based on determining, at the second scan time, that the cloud resource is in a suspended state.

18. The non-transitory computer-readable medium of claim 16, wherein the one or more instructions, that cause the scheduling system to align the cloud resource with the target state based at least in part on the determination at the second scan time, cause the scheduling system to:

determine that the target state is a suspended state; and suspend the cloud resource based on determining, at the second scan time, that the cloud resource is in a running state.

19. The non-transitory computer-readable medium of claim 16, wherein the one or more instructions, that cause the scheduling system to align the cloud resource with the target state based at least in part on the determination at the second scan time, cause the scheduling system to:

maintain a current state of the cloud resource corresponding to the target window based on determining, at the second scan time, that the current state of the cloud resource matches the target state for the cloud resource corresponding to the target window.

20. The non-transitory computer-readable medium of claim 16, wherein the one or more instructions further cause the scheduling system to:

adjust the regular continuous schedule to include, prior to a starting time of one or more uptime windows, a buffer period that is associated with a running state of the cloud resource corresponding to the target window.

\* \* \* \* \*